(12) United States Patent
Maluf et al.

(10) Patent No.: US 12,432,183 B2
(45) Date of Patent: *Sep. 30, 2025

(54) RANDOMIZING SERVER-SIDE ADDRESSES

(71) Applicant: Cisco Technology, Inc., San Jose, CA (US)

(72) Inventors: David A. Maluf, Mountain View, CA (US); Srinath Gundavelli, San Jose, CA (US); Pascal Thubert, Roquefort les Pins (FR); Pradeep Kumar Kathail, Los Altos, CA (US); Eric Levy-Abegnoli, Roquefort les Pins (FR); Eric Voit, Bethesda, MD (US); Ali Sajassi, Alamo, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/659,296

(22) Filed: May 9, 2024

(65) Prior Publication Data
US 2024/0297868 A1  Sep. 5, 2024

Related U.S. Application Data

(63) Continuation of application No. 18/104,603, filed on Feb. 1, 2023, now Pat. No. 12,034,707, which is a
(Continued)

(51) Int. Cl.
*H04L 9/40* (2022.01)
*H04L 61/2521* (2022.01)
(Continued)

(52) U.S. Cl.
CPC ...... *H04L 63/0421* (2013.01); *H04L 61/2525* (2013.01); *H04L 61/2539* (2013.01); *H04L 61/4511* (2022.05)

(58) Field of Classification Search
CPC ............ H04L 61/2503; H04L 61/2525; H04L 61/2539; H04L 61/4511; H04L 63/0236;
(Continued)

(56) References Cited

U.S. PATENT DOCUMENTS 6,434,627 B1   8/2002  Millet et al.
7,072,657 B2   7/2006  Watanabe et al.
(Continued)

FOREIGN PATENT DOCUMENTS

CN   106713528 A    5/2017
EP      3972218 A1  3/2022
(Continued)

OTHER PUBLICATIONS

International Search Report and Written Opinion for International Application No. PCT/US2022/050254, mailed Jan. 25, 2023, 13 Pages.
(Continued)

*Primary Examiner* — Tauqir Hussain
(74) *Attorney, Agent, or Firm* — Lee & Hayes, P.C.

(57) ABSTRACT

Techniques for using Network Address Translation (NAT), Mobile Internet Protocol (MIP), and/or other techniques in conjunction with Domain Name System (DNS) to anonymize server-side addresses in data communications. Rather than having DNS provide a client device with an IP address of an endpoint device, such as a server, the DNS instead returns a random IP address that is mapped to the client device and the endpoint device. In this way, IP addresses of servers are obfuscated by a random IP address that cannot be used to identify the endpoint device or service. The client device may then communicate data packets to the server using the random IP address as the destination address, and a gateway that works in conjunction with DNS can convert
(Continued)

the random IP address to the actual IP address of the server using NAT and forward the data packet onto the server.

20 Claims, 13 Drawing Sheets

Related U.S. Application Data continuation-in-part of application No. 17/530,244, filed on Nov. 18, 2021, now Pat. No. 11,683,286.

(60) Provisional application No. 63/333,641, filed on Apr. 22, 2022.

(51) Int. Cl.
*H04L 61/2539* (2022.01)
*H04L 61/4511* (2022.01)

(58) Field of Classification Search
CPC ............ H04L 63/0421; H04L 63/1458; H04L 63/0407; H04L 63/1408; H04L 12/28; H04L 67/02; H04L 67/535; G06F 16/9566; G06F 21/577; G06F 21/606; G06Q 20/29
See application file for complete search history.

(56) References Cited

U.S. PATENT DOCUMENTS

| | | | |
|---|---|---|---|
| 7,162,529 B2 | 1/2007 | Morishige et al. |
| 7,313,631 B1 | 12/2007 | Sesmun et al. |
| 7,453,852 B2 | 11/2008 | Buddhikot et al. |
| 7,539,159 B2 | 5/2009 | Devarapalli et al. |
| 7,564,825 B2 | 7/2009 | Olivereau et al. |
| 7,660,296 B2 | 2/2010 | Fletcher et al. |
| 7,680,123 B2 | 3/2010 | Veerepalli |
| 7,725,600 B2 | 5/2010 | Zheng et al. |
| 7,848,757 B2 | 12/2010 | Duggi et al. |
| 7,949,785 B2 | 5/2011 | Alkhatib et al. |
| 8,170,017 B2 | 5/2012 | Fletcher et al. |
| 8,175,056 B2 | 5/2012 | Suh et al. |
| 8,254,311 B2 | 8/2012 | Morimoto |
| 8,385,300 B2 | 2/2013 | Andreasen et al. |
| 8,464,334 B1 | 6/2013 | Singhal |
| 8,477,685 B2 | 7/2013 | Yan |
| 8,489,670 B1 | 7/2013 | Fletcher et al. |
| 8,588,233 B1 | 11/2013 | Lohner et al. |
| 8,665,873 B2 | 3/2014 | Sarikaya et al. |
| 8,730,966 B2 | 5/2014 | Awano |
| 8,843,657 B2 | 9/2014 | Thubert et al. |
| 8,849,983 B2 | 9/2014 | Williams et al. |
| 8,891,522 B2 | 11/2014 | Fletcher et al. |
| 8,914,445 B2 | 12/2014 | Sarikaya et al. |
| 9,015,318 B1 | 4/2015 | Batz et al. |
| 9,137,196 B2 | 9/2015 | Lohner et al. |
| 9,137,339 B2 | 9/2015 | Fletcher et al. |
| 9,154,900 B1 | 10/2015 | Addepalli et al. |
| 9,300,638 B2 * | 3/2016 | Fink ................... H04L 61/2539 |
| 9,531,667 B2 | 12/2016 | Lohner et al. |
| 9,642,077 B2 | 5/2017 | Mathai et al. |
| 9,736,278 B1 | 8/2017 | Hammam et al. |
| 9,813,343 B2 | 11/2017 | Williams et al. |
| 9,876,760 B2 | 1/2018 | Lohner et al. |
| 10,079,803 B2 | 9/2018 | Lohner et al. |
| 10,084,756 B2 | 9/2018 | Tatlicioglu et al. |
| 10,135,915 B2 | 11/2018 | Tang et al. |
| 10,244,084 B2 | 3/2019 | Fletcher et al. |
| 10,257,157 B2 | 4/2019 | Martini |
| 10,270,809 B2 | 4/2019 | Williams et al. |
| 10,541,925 B2 | 1/2020 | Arora et al. |
| 10,542,057 B2 | 1/2020 | Gero et al. |
| 10,630,489 B2 | 4/2020 | Hughes |
| 10,728,932 B2 | 7/2020 | Ohta et al. |
| 10,778,637 B2 | 9/2020 | Jeong et al. |
| 10,903,998 B2 | 1/2021 | Nicol |
| 10,951,672 B2 | 3/2021 | Gero et al. |
| 10,986,027 B1 | 4/2021 | Sears et al. |
| 11,025,477 B2 | 6/2021 | Ruel et al. |
| 11,032,257 B1 | 6/2021 | Rankin |
| 11,055,166 B2 | 7/2021 | Rankin et al. |
| 11,070,473 B2 | 7/2021 | Williams et al. |
| 11,082,334 B2 | 8/2021 | Parasmal et al. |
| 11,128,608 B2 | 9/2021 | Gudur et al. |
| 11,290,429 B1 | 3/2022 | Ashley et al. |
| 11,290,765 B2 | 3/2022 | Williams et al. |
| 11,411,996 B2 | 8/2022 | Williams et al. |
| 11,418,352 B2 | 8/2022 | Williams et al. |
| 11,432,346 B2 | 8/2022 | Ohta et al. |
| 11,481,514 B1 | 10/2022 | Li et al. |
| 11,558,430 B2 | 1/2023 | Hashida |
| 11,658,818 B2 | 5/2023 | Nicol |
| 11,683,286 B2 | 6/2023 | Thubert et al. |
| 11,690,092 B2 | 6/2023 | Ohta et al. |
| 11,700,233 B2 | 7/2023 | St. Pierre |
| 11,716,368 B2 | 8/2023 | Gero et al. |
| 11,729,184 B2 | 8/2023 | Rankin et al. |
| 11,737,128 B2 | 8/2023 | Ohta et al. |
| 11,792,155 B2 | 10/2023 | Rao et al. |
| 11,799,824 B2 | 10/2023 | Rao et al. |
| 11,805,061 B2 | 10/2023 | Sears et al. |
| 11,818,279 B2 | 11/2023 | Williams et al. |
| 11,861,025 B1 | 1/2024 | Rankin |
| 11,916,876 B2 | 2/2024 | St. Pierre |
| 2002/0023152 A1* | 2/2002 | Oguchi ............... H04L 61/4511 709/223 |
| 2003/0037235 A1 | 2/2003 | Aziz et al. |
| 2003/0061170 A1* | 3/2003 | Uzo ...................... G06Q 20/29 705/37 |
| 2003/0233452 A1 | 12/2003 | Maufer et al. |
| 2004/0139227 A1 | 7/2004 | Takeda |
| 2004/0249973 A1 | 12/2004 | Alkhatib et al. |
| 2007/0081530 A1 | 4/2007 | Nomura et al. |
| 2007/0183363 A1 | 8/2007 | Liden |
| 2008/0059596 A1 | 3/2008 | Ogawa |
| 2008/0320119 A1* | 12/2008 | Achan ................. H04L 63/1408 709/222 |
| 2009/0031042 A1 | 1/2009 | Phatak |
| 2011/0019547 A1* | 1/2011 | De Lutiis ................ H04L 61/50 370/231 |
| 2013/0212240 A1 | 8/2013 | Thornewell et al. |
| 2014/0007238 A1* | 1/2014 | Magee .................. G06F 21/577 726/24 |
| 2014/0092899 A1 | 4/2014 | Krishna et al. |
| 2015/0372969 A1* | 12/2015 | Hopkins ............. H04L 61/4511 709/203 |
| 2016/0044054 A1* | 2/2016 | Stiansen ............. H04L 63/1416 726/24 |
| 2016/0226815 A1 | 8/2016 | Wan et al. |
| 2017/0032147 A1* | 2/2017 | Denner ................ H04L 67/535 |
| 2017/0111389 A1 | 4/2017 | Kasman et al. |
| 2017/0155678 A1 | 6/2017 | Ara et al. |
| 2017/0195237 A1 | 7/2017 | Parasmal et al. |
| 2017/0374034 A1* | 12/2017 | Zuniga ................ H04L 63/0407 |
| 2017/0374088 A1* | 12/2017 | Pappu ................ H04L 61/4511 |
| 2018/0035440 A1 | 2/2018 | Ohta |
| 2018/0124008 A1* | 5/2018 | Tackabury .......... H04L 61/2514 |
| 2018/0302438 A1* | 10/2018 | Robertson .............. H04L 63/20 |
| 2019/0199637 A1 | 6/2019 | Paramasivam |
| 2019/0386969 A1* | 12/2019 | Verzun .................. G06F 21/606 |
| 2020/0028819 A1* | 1/2020 | Hugot .................... H04L 67/02 |
| 2020/0162431 A1* | 5/2020 | Goldschlag ........... H04L 9/3218 |
| 2020/0259763 A1* | 8/2020 | Guim Bernat ...... H04L 43/0852 |
| 2021/0014939 A1* | 1/2021 | Verzun .................... H04L 12/28 |
| 2021/0029167 A1* | 1/2021 | Jeong .................. H04L 63/1425 |
| 2021/0352045 A1 | 11/2021 | Kodavanty |
| 2022/0060894 A1 | 2/2022 | Pazhyannur et al. |
| 2022/0103525 A1* | 3/2022 | Shribman ............. G06F 16/955 |
| 2022/0171359 A1 | 6/2022 | Nagata |
| 2022/0191209 A1* | 6/2022 | Broda .................. H04L 63/102 |
| 2022/0394063 A1 | 12/2022 | Pauly et al. |
| 2023/0024475 A1 | 1/2023 | Mandeyam et al. |
| 2023/0025679 A1 | 1/2023 | Mandeyam et al. |
| 2023/0179579 A1 | 6/2023 | Maluf et al. |

(56) References Cited

U.S. PATENT DOCUMENTS

| | | |
|---|---|---|
| 2023/0275868 A1 | 8/2023 | Thubert et al. |
| 2024/0015133 A1 | 1/2024 | Rao et al. |
| 2024/0039897 A1 | 2/2024 | Gundavelli et al. |
| 2024/0244028 A1 | 7/2024 | Thubert et al. |

FOREIGN PATENT DOCUMENTS

| | | |
|---|---|---|
| WO | 2021014204 A1 | 1/2021 |
| WO | 2023091574 A1 | 5/2023 |

OTHER PUBLICATIONS

International Search Report and Written Opinion for International Application No. PCT/US2023/19387, mailed Jun. 14, 2023, 11 Pages.

Michalski J.T., "Network Security Mechanisms Utilising Network Address Translation," Researchgate, International Journal of Critical Infrastructures, Jan. 2006, vol. 2, No. 1, 40 Pages.

Patel P., et al., Ananta: Cloud Scale Load Balancing Computer Communication Review, vol. 43, No. 4, XP055440057, US ISSN: 0146-4833, DOI: 10.1145/2534169.2486026 paragraphs [02.11, (3.2.1], [3.2.2], Aug. 27, 2013, pp. 207-218.

Office Action for U.S. Appl. No. 18/620,619, mailed Oct. 7, 2024, 8 pages.

\* cited by examiner

RANDOMIZING SERVER-SIDE ADDRESSES

RELATED APPLICATIONS

This application is a continuation of U.S. patent application Ser. No. 18/104,603, filed Feb. 1, 2023, which claims priority to U.S. Provisional Patent Application No. 63/333,641, filed on Apr. 22, 2022, and further claims priority to, and is a continuation-in-part of U.S. patent application Ser. No. 17/530,244, both of which are incorporated by reference herein in their entirety.

TECHNICAL FIELD

The present disclosure relates generally to anonymizing and/or randomizing addresses of endpoints, such as servers, in traffic communicated from source devices.

BACKGROUND

Networks, such as the Internet, use the Domain Name System (DNS) to essentially provide mappings between human-readable domain names (e.g., website addresses, service addresses, etc.) that client devices are seeking, and the actual Internet Protocol (IP) addresses for devices hosting the websites or providing the services. Generally, client devices send DNS queries to resolve domain names to a DNS server, and the DNS server then resolves the domain names to the corresponding IP addresses and sends DNS responses to the client devices that include the IP addresses. The client devices are then able to communicate data packets with the desired website or service using the IP address of the device(s) supporting the website or service.

Client devices often send information in data packets that is sensitive or private, and when the data packets are sent over public networks, the information in those packets can be viewed or analyzed by potentially entities. Accordingly, various types of encryption protocols (e.g., Hypertext Transfer Protocol Secure (HTTPS)) are used to communicate data packets over networks such that the payload of the data packets is encrypted to prevent entities from discerning sensitive information. However, the headers of the data packets are not unencrypted because information in the headers such as IP source and destination addresses are often needed to make networking decisions. For instance, destination IP addresses are used to make routing decisions such that the data packets reach the correct destinations, source IP addresses can be used to make firewall decisions to drop or allow packets, and so forth. However, client devices may further desire that information in the headers is obfuscated as well from potentially malicious entities, such as the source address.

In light of this, there have been large efforts to develop techniques to anonymize the client devices' IP addresses (and/or other information such as Media Access Control (MAC) addresses) to protect the privacy of users. However, the destination addresses in the packets are generally still visible because they need to be used for networking decisions, such as routing decisions. Various issues arise due to the visibility of the IP addresses shown in the destination address field. The analogy for this is in the example a malicious actor will get more from robbing a bank (being the destination of depositors) than robbing the individual depositor one at a time. Therefore, once the address of the destination device (e.g., server, endpoint, etc.) is known to a malicious entity, the address can be used for direct attacks on the destination device (e.g., ransomware attacks where destinations are taken hostage, distributed denial-of-service (DDOS) attacks, etc.). It can be very difficult to discriminate legitimate traffic to the servers from attacks. Additionally, malicious entities may be able to observe where the client devices are sending traffic, or which sites they are consulting. If the malicious entities are close to the client device, the malicious entities may be able to correlate the client device and server, thereby eliminating privacy of the client device. Thus, destination devices, such as servers or other endpoints, are vulnerable to various attacks by malicious entities.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
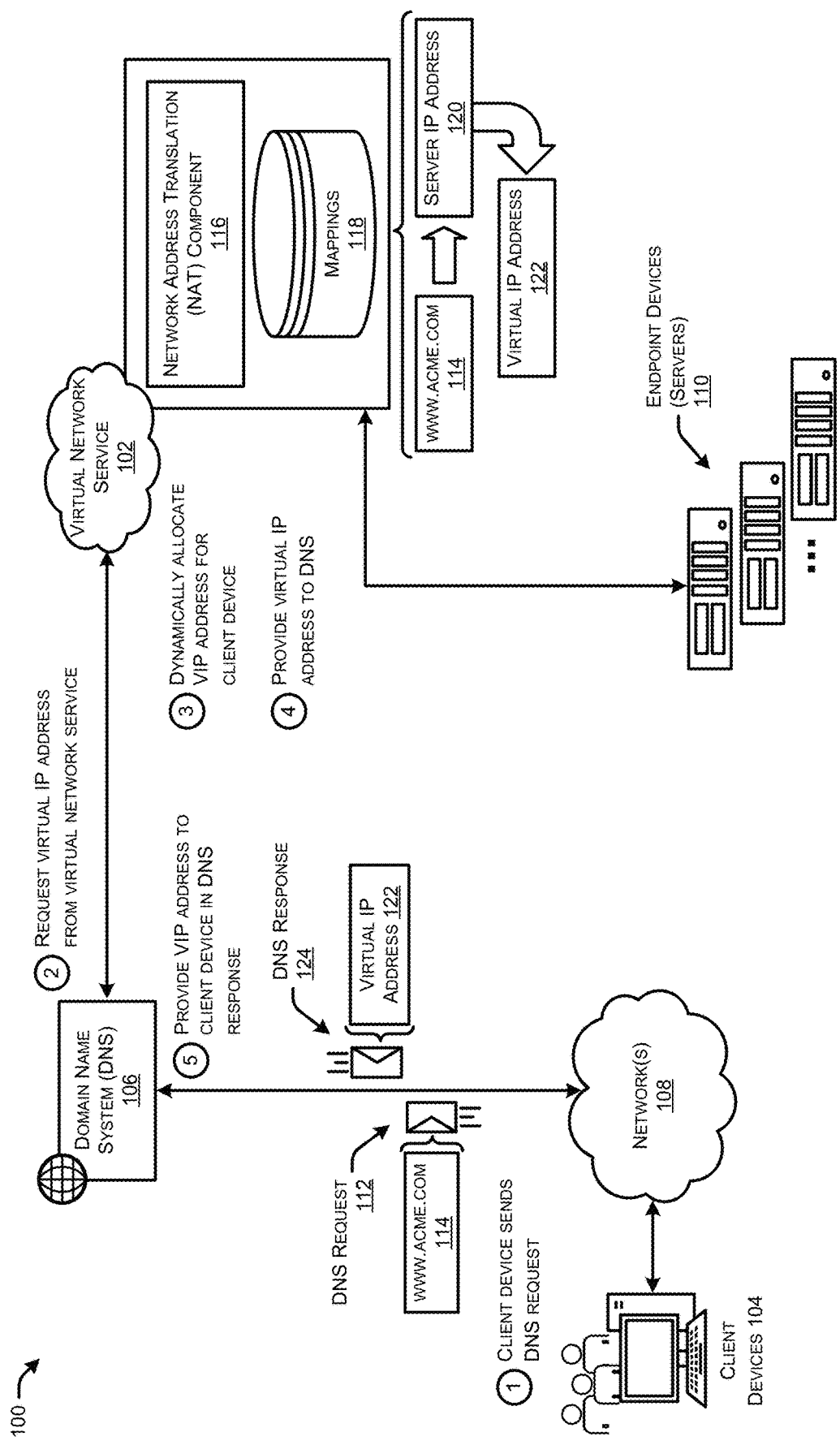
FIG. 1A illustrates a system-architecture diagram of a virtual network service that maps virtual IP (VIP) addresses to IP addresses of endpoints devices such that a DNS server can provide client devices with respective VIP addresses that are usable to reach the endpoint devices.

This disclosure describes techniques for using MIPv6, NAT, and/or other techniques in conjunction with DNS to anonymize and/or randomize server-side addresses in data communications.

A first method to perform techniques described herein includes mapping an Internet Protocol (IP) address of an endpoint (e.g., server) to a group of virtual IP (VIP) addresses, such as allocating as block of VIP prefixes for the IP of the server. The first method may further include receiving a Domain Name Service (DNS) request to resolve a domain name on behalf of a client device, and converting the domain name into the IP address of the endpoint. The first method may further include selecting a first VIP address from the group of VIP addresses to provide to the client device, and providing the first VIP address for use by the client device to contact the endpoint.

In some instances, the first method may further include receiving a packet having a destination address that is the first VIP address, determining that a source address of the packet is a source IP address of the client device sent the packet, performing Network Address Translation (NAT) by changing the destination address of the packet from the first VIP address to the IP address of the endpoint, and sending the packet to a next hop associated with the IP address of the endpoint. The method of claim 1 may be performed by a system and/or device that includes a DNS server or is associated with a DNS server.

In some instances, the techniques described herein include a second method. The second method may include mapping an IP address of an endpoint to a group of VIP addresses. The second method may further include determining that a client device requested the IP address of the endpoint, selecting a first VIP address from the group of VIP addresses to provide to the client device, and storing a first association between a client identifier (ID) of the client device and the first VIP address. Further, the second method may include providing the first VIP address for use by the client device to contact the endpoint, and receiving a first packet having a destination address that is the first VIP address. The second method may include, in response to determining that the first packet was sent from the client device, sending the first packet to the endpoint, or in response to determining that the first packet was sent from a different device, dropping the first packet.

In some instances, the techniques described herein include a third method that may be performed at least partly by an agent. The third method may include receiving a DNS request to resolve a domain name on behalf of a client device, and providing the DNS request to a DNS resolver of the DNS service. The third method may further include receiving, from a DNS service, an indication of an actual IP address that corresponds to the domain name and is usable to communicate with an endpoint. Further, the third method may include generating a new IP in the IPv6 format constituting a Prefix and an Interface IP segments where the gateway IP is set a the prefix IP and the interface IP is a random IP address being the interface IP of the destination endpoint behind the gateway, and creating a mapping between the random IP address to the actual IP address of the endpoint. The third method may further include providing the mapping to a gateway that manages connections to the endpoint.

In some instances, the techniques described herein include a fourth method that may be performed at least partly by a gateway. The fourth method may include receiving a mapping between an actual interface IP address of an endpoint and a random interface IP address of generated for the endpoint. The fourth method may further include storing an indication of the mapping, and receiving, from a client device, a request for a connection to a particular endpoint associated with the gateway. Further, the fourth method may include identifying the interface component as random interface IP address from the request, and determining, using the mapping, that the random interface IP address maps to the actual interface IP address of the endpoint. Further, the fourth method may include causing the connection to be established between the client device and the endpoint.

Additionally, the techniques described herein may be performed by a system and/or device having non-transitory computer-readable media storing computer-executable instructions that, when executed by one or more processors, performs the method described above.

Example Embodiments

Generally, the address of a website that a client device visits is indicative of the location of the server and/or the cloud tenant that includes the server, and can be used to approximate the website that the client device is visiting. With Transport Layer Security (TLS), HTTPS, and the like, that is some of the only information available to an observer on path that may do operations like slowing or blocking some destinations, or use the information against the client in whichever fashion. (An example of intrusive analytics can identify a client a banker as his traffic by observing the repetitive access to a financial server.) While techniques have been developed to protect the source address of the client device, there are no techniques for protecting the address of the server, which is only partially hidden from public view by complex cloud architectures and load balancers.

The techniques described herein obfuscate the destination IP so additional aspects of the packet become private and random in this case.

This disclosure describes techniques for using NAT, MIP, and/or other techniques in conjunction with DNS to anonymize server-side addresses in data communications. Rather than having DNS provide a client device with an IP address of an endpoint device, such as a server, the DNS instead returns a virtual IP (VIP) address that is mapped to the client device and the endpoint device. In this way, IP addresses of servers are obfuscated by a virtual network of VIP addresses. The client device may then communicate data packets to the server using the VIP address as the destination address, and a virtual network service that works in conjunction with DNS can convert the VIP address to the actual IP address of the server using NAT and forward the data packet onto the server.

A client device may send a DNS request to a DNS server for the DNS server to translate or resolve a domain name (e.g., website name, service name, etc.) to an IP address that is usable to contact the domain name. Traditionally, the DNS server would simply resolve the domain into the IP address (and/or other contact information) registered for the server and return the IP address to the client device. However, according to the techniques described herein, a virtual network service may work in conjunction (and/or be included in) the DNS service to provide VIP addresses on a client device-by-client device basis. That is, the virtual network service may associate a virtual network of IP addresses, or VIP addresses, for each IP address. As client devices request the DNS for the IP address of a particular server, the virtual network service and/or DNS may provide a different VIP address mapped to the IP address to each client device, and store a mapping between each VIP address and the client device that received the VIP address. Thus, client devices may request that DNS provide them with an IP address for a particular server, and each client device may be provided with a different VIP address that is mapped to the IP address by the virtual network service.

After receiving a VIP address, the client device may then attempt to send data packets to the particular server by placing the VIP address in the destination address field of the packets. However, the VIP address may result in the data packets being steered to the virtual network service. The virtual network service may then determine that the VIP address maps to the IP address of the particular server, and may further determine that the client device was in fact provided the VIP address, and the virtual network service may perform NAT on the data packets. That is, the virtual network service may translate the VIP address in the destination field of the packets to the IP address of the particular server and send the packets to the particular server. In this way, the destination address of servers may be represented by VIP address that are not actually the IP addresses of the servers, but can be translated using NAT techniques into the correct IP addresses for reaching the servers.

In addition to obfuscating the IP addresses of servers and endpoints to prevent attacks on the servers, the techniques may further allow the virtual network service to track source devices that may be attacking the servers. For instance, the virtual network service may note the source addresses that are using VIP addresses to attempt to reach the servers despite those source devices not being provided the VIP addresses by the virtual network service.

In some instances, the virtual network service may additionally ensure that traffic returning to the client device and from the servers is also protected. That is, the servers may be configured to utilize their IP addresses as source addresses in data packets. In such examples, the virtual network service may also convert the source IP address of the client devices into system VIP addresses that are virtual addresses that map back to the virtual network service. Generally, the virtual network service may map a respective system VIP address to each client device such that the return traffic from the servers can be redirected back to the appropriate client device. So, when servers receive the traffic having source addresses that are system VIP addresses for the virtual network service, the servers may respond with data packets that include the respective system VIP address as a destination address. Once the virtual network service receives the packet, the virtual network service translates the destination address from the system VIP address into the IP address of the appropriate client device. In this way, the virtual network service may also obfuscate client device IP addresses while ensuring that return traffic from the servers reach the correct client device.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram 100 of a virtual network service 102 that maps VIP addresses to IP addresses of endpoints devices such that a DNS server can provide client devices with respective VIP addresses that are usable to reach the endpoint devices.

As illustrated, client devices 104 are able to communicate with DNS 106, which is generally one or more DNS servers that perform DNS operations. The client devices 104 may be any type of computing device that uses DNS to communicate with one or more endpoint devices 110. For instance, the client devices 104 may be personal user devices (e.g., desktop computers, laptop computers, phones, tablets, wearable devices, entertainment devices such as televisions, etc.), network devices (e.g., servers, routers, switches, access points, etc.), and/or any other type of computing devices.

The client devices 104 may communicate with the DNS 106, the virtual network service 102, the endpoint devices 110, and/or any other computing devices over one or more networks 108, such as the Internet. The network(s) 108 may each include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

At "1," a client device 104 may generate and send a DNS request 112 to the DNS 106. The DNS request 112 may include a request for the DNS 106 to translate a domain name (e.g., "www.acme.com") into an IP address that can be used for sending traffic to the desired website, service, etc., associated with the domain name.

The DNS 106 may receive the DNS request 112 and, at "2," request a VIP address from the virtual network service 102. The DNS 106 may also provide the virtual network service 102 with an indication of the domain name that the client device 104 would like translated into an IP address. In other examples, the DNS 106 may provide the actual IP address to the virtual network service 102 for the desired domain name.

Although illustrated as separate entities that communicate with each other, in some instances the DNS 106 and virtual network service 102 may be the same entity. That is, the DNS 106 may include the virtual network service 102, the virtual network service 102 may include the DNS 106, and so forth. The virtual network service 102 may be a cloud-based security service, a NAT service, and/or any type of platform or system.

The virtual network service 102 may receive the request for the VIP address for the domain name/IP address and at "3" dynamically allocate a VIP address for the client device. Generally, the virtual network service 102 may map or otherwise assign VIP addresses (e.g., virtual network) to IP addresses of endpoints 110. In some examples, the virtual network service 102 may allocate a prefix (e.g., /64 for IPv6, /24 for IPv4) in a geography to protect the addresses of the servers 110 that it serves in that geography. In the case of IPv4, the stat is indexed by the pair client address+virtual address, so the same virtual address can be used for multiple clients to denote different real servers 110 in some instances. As illustrated, the virtual network service 102 may map the domain name 114 to the service IP address 120 for the service or website, and may then map that server IP address 120 to the virtual IP address 122.

At "4," the virtual network service 102 may provide the VIP address to the DNS and/or directly to the client device 104. The VIP address 122 may be provided to the client device 104 in a DNS response 124 such that the client device 104 determines that the VIP address is usable to contact the desired endpoint device 110. Although illustrated as servers, the endpoint devices 110 can generally be any device that a client device 104 would like to contact, including user devices (e.g., laptops, phones, wearable devices, etc.), network devices (e.g., routers, switches, hubs, etc.), and/or any other type of devices that can be contacted over networks 108.

Figure 1B:
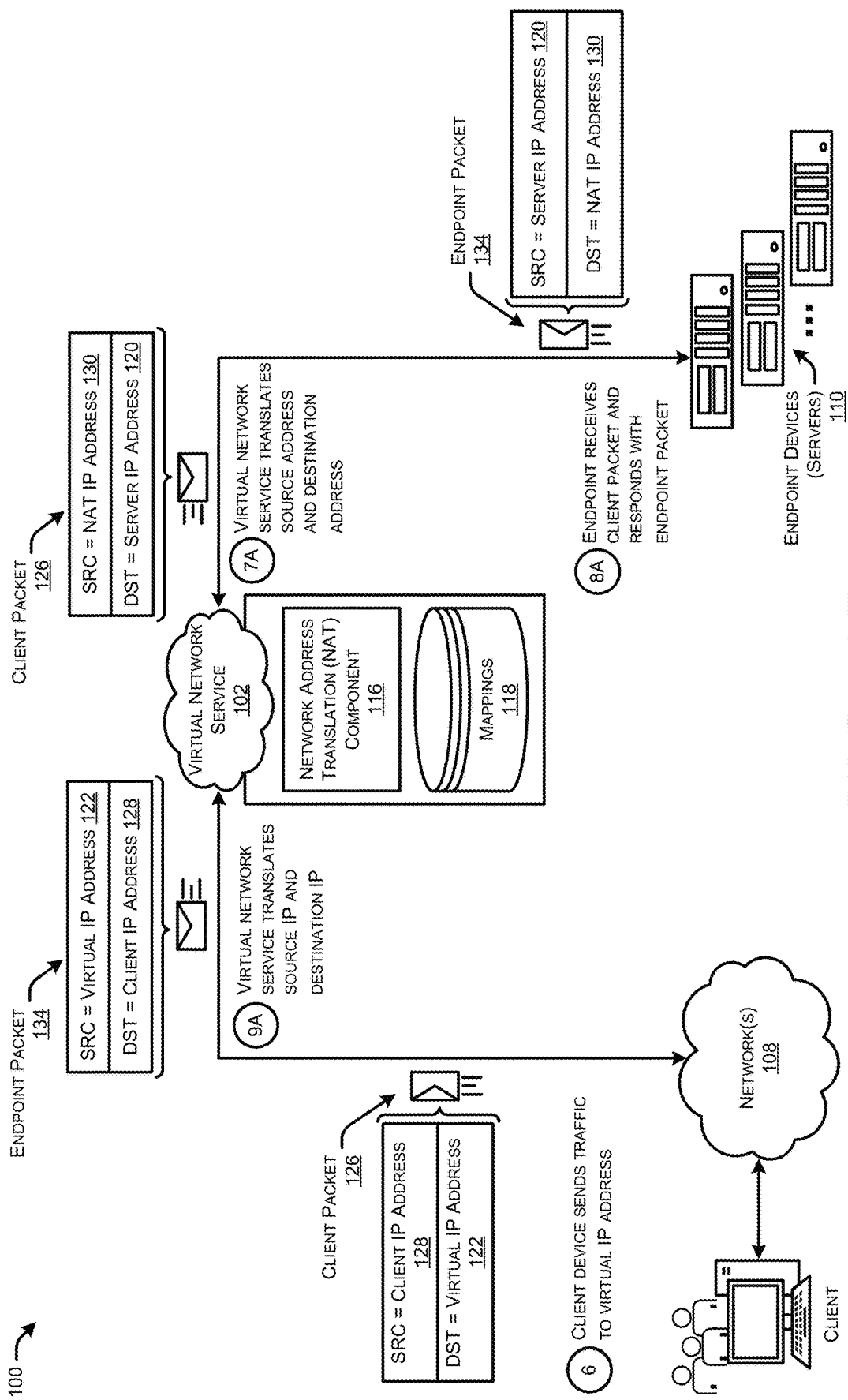
FIG. 1B illustrates a system-architecture diagram of a virtual network service that performs Network Address Translation (NAT) to convert a destination address of packets sent from a client device from a VIP address to an IP address of the endpoint device.

FIG. 1B illustrates a system-architecture diagram 100 of a virtual network service 102 that performs Network Address Translation (NAT) to convert a destination address of packets sent from a client device 104 from a VIP address to an IP address of the endpoint device 110.

At "6," the client device 104 may send traffic including a client packet 126 to the VIP address 122 that was provided in the DNS response 124. The client packet 126 may include the VIP address 122 corresponding to the desired endpoint device 110 as the destination address, and may further include the client IP address 128 of the client device 104 as the source address. Generally, the VIP address 122 may cause the client packet 126 to be communicated to the virtual network service 102 by devices in the network(s) 108.

At "7A," the virtual network service 102 may translate the source address and the destination address of the client packet 126 using NAT techniques. For instance, a NAT component 116 may utilize mappings 118 to determine how to translate or convert the addresses. Specifically, the NAT component 116 may translate the VIP address 122 to the actual service IP address 120 of the server/endpoint device 110 and place the server IP address 120 in the destination address of the client packet 126.

In some examples, optionally, the virtual network service 102 may additionally performing NAT techniques to translate the source address of the client packet 126 such that return traffic from the endpoint devices 110 is sent to the virtual network service 102. For instance, the NAT component 116 may utilize VIP addresses (NAT IP addresses) corresponding to the virtual network service 102 as source addresses such that return traffic is sent to the virtual network service 102. The NAT component 116 may translate the client IP address 128 in the source address field of the packet 126 into a particular NAT IP address 130, and store a mapping 118 between the client device 104 and the NAT IP address 130. In some instances, client devices 104 may have respective NAT IP addresses 130 such that the virtual network service 102 can cause return traffic from the endpoint devices 110 flow back through the virtual network service 102. Thus, the NAT component 116 may translate the source address of the client packet 126 to a NAT IP address 130 that corresponds to the virtual network service 102, and is mapped in the mappings 118 to a client ID of the client device 104 (e.g., the client IP address 128 in some instances).

The client packet 126 is then communicated to the endpoint device 110 corresponding to the server IP address 120 (and the corresponding VIP address 122) indicated in the client packet 126. The endpoint device 110 may, in some examples, determine to respond to the client device 104. The endpoint device 110 may use the source address of the client packet 126 (e.g., the NAT IP address 130) as the destination address in the endpoint packet 134, and the server IP address 132 as the source address. Thus, the endpoint device 110 may send one or more endpoint packets 134 with the NAT IP address 130 as the destination address such that the endpoint packet 134 is sent to the virtual network service 102 at "8A."

The NAT component 116 may, at "9A," translate the source IP address and the destination IP address in the endpoint packet 134. The NAT component 116 may use the mappings 118 to translate the NAT IP address 130 in the destination address field to the client IP address 128 of the client device 104 such that the endpoint packet 134 is sent to the client device 104. Further, the NAT component 116 may use the mappings 118 to translate the server IP address 120 in the source address field to the virtual IP address 122 that is allocated by the virtual network service 102. In this way, any return traffic from the client device 104 may be sent to the VIP address 122 that is the source address of the endpoint packet 134. The endpoint packet 134 may then be sent to the client device 104.

Figure 1C:
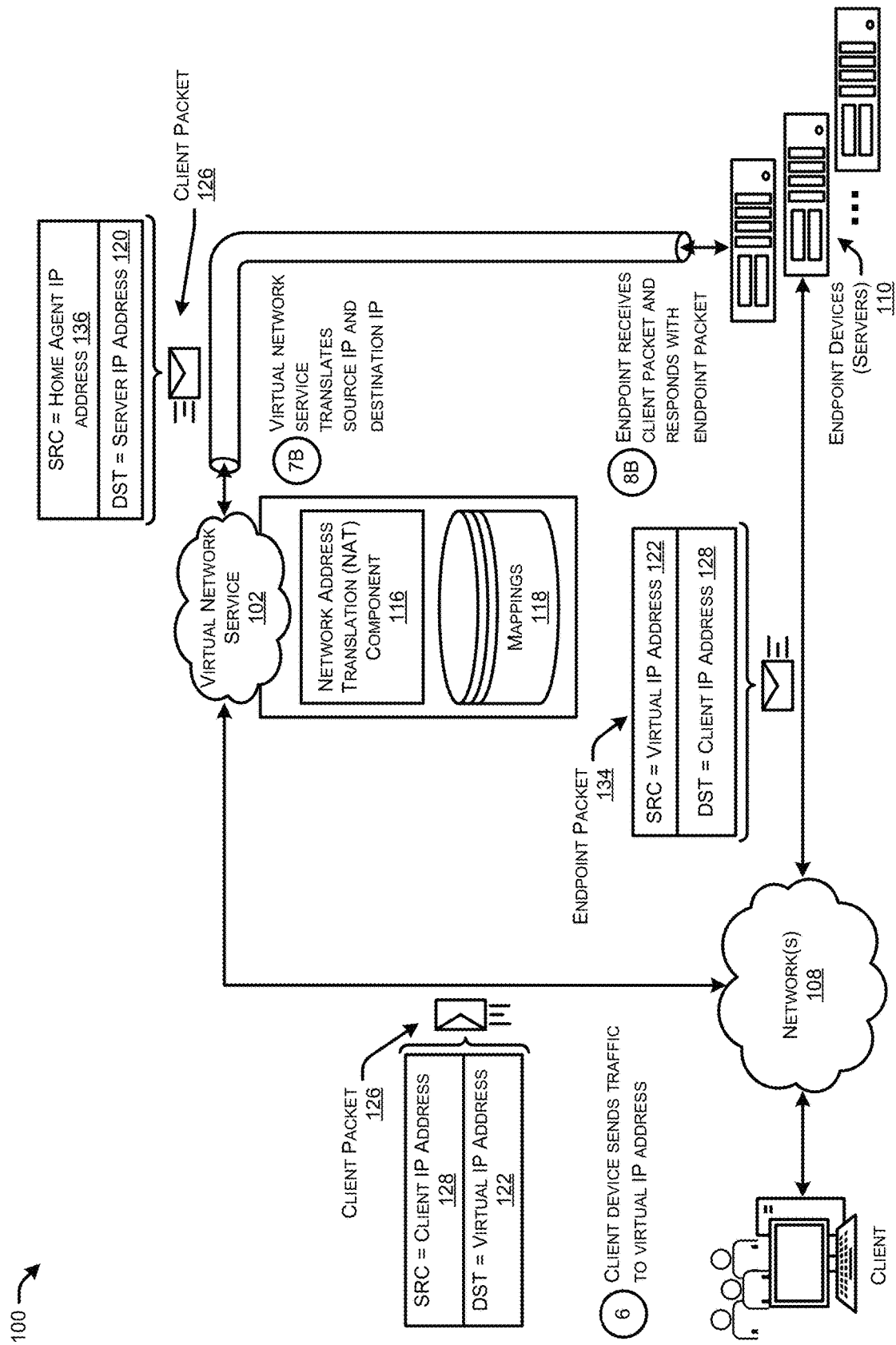
FIG. 1C illustrates a system-architecture diagram of a virtual network service that uses a Home Address option of Mobile IP version 6 (MIPv6) to allow a server to communicate with a home agent of a client device.

FIG. 1C illustrates a system-architecture diagram 100 of a virtual network service 102 that uses a Home Address option of Mobile IP version 6 (MIPv6) to allow a server to communicate with a home agent of a client device.

At "6," the client device 104 may send traffic including a client packet 126 to the VIP address 122 that was provided in the DNS response 124. The client packet 126 may include the VIP address 122 corresponding to the desired endpoint device 110 as the destination address, and may further include the client IP address 128 of the client device 104 as the source address. Generally, the VIP address 122 may cause the client packet 126 to be communicated to the virtual network service 102 by devices in the network(s) 108.

In the example of FIG. 1C, the techniques may be performed according to home agent techniques of Mobile IPv6 defined by Request for Comments (RFC) 6275. The DNS 106 may use a new interface with a HA function where the interface enables the DNS server 106 to query the HA function for a virtual address upon a DNS request. The novel query contains the client address and the server address that it would have returned by the DNS server without the invention. for its customers, the HA function returns an address from the /64 in the virtual interface. The end result is that the set of clients of the virtual network service 102 appear to be located in the same flat subnet, with the effect to hide the topology and the server addresses altogether.

Using that interface, when a new DNS request 124 is made (either by new client 104 or for a different server from a known client 104), one virtual address (serving as home address in mobility management) in the /64 is allocated dynamically by the HA, returned to the DNS server 106 and that is the address returned to the client in the DNS response 124. The server address used but a given client will remain constant as long as the client uses the server without doing a new DNS lookup from a new source address. When the same client does the same request again, it is usually preferable to return the same address as the first time to keep the sessions going. To that effect, the techniques described herein include load-balancing the DNS 106 to HA interface based on the client address, or a hash of the client address and the DNS name. This way the same request is served by the same HA server which can return the virtual IP address from an existing state if one is found.

A home agent function (from MIPv6 RFC 6275 or similar mobility protocol) is associated to the virtual network service 102. That home agent function tunnels the packet for the virtual address assigned to the server to the real address of the server (used as Care-Of Address in the packet). MIPv6 uses a normal tunnel but alternates like SRH insertion and NAT or PAT are possible. In the case of NAT, the home agent also NATs the source address to another address it owns, so as to be on path of the traffic back.

In the case of MIPv6, the server 110 can use some Home Address option to talk to the Home agent WRT to the particular client device 104. In-band (in the tunnel as an implicit function) or out of band, the home agent instructs the server 110 to support the home address, e.g., add it to a loop back or just store it in the socket information. When it responds, the server 110 responds with that virtual HA IP address 136. If ingress filtering—BCP 38, RFC 2827—is enforced, the server needs to tunnel back to the home agent, using its real address as source. This enables the server 110 to do its real process but based on the virtual IP, so any application state and crypto that relies on that address continues to work. When that is not needs it is also possible for the stack to absorb the addresses and only present the real server and client addresses to the upper layers, in a fashion similar-though stateless in this case-of host identity protocol (HIP). In the case of IPv4, a NAT function in the cloud service provides the same result, which can be achieved without tunneling.

The home agent is located in the virtual network service 102. Packets to and from the home agent and the server are tunneled to using the Home Address option from the server to the home agent, in which case the source is the server and the destination is the home agent with no encapsulation. To hide the IP address of the server (the Care-of Address in MIPv6 terms), the server 110 can answer to the client device 104 using the home address (e.g., virtual IP address 122) as source and the client IP address 128 as destination. In this example, there is no destination option and no encapsulation.

Figure 2:
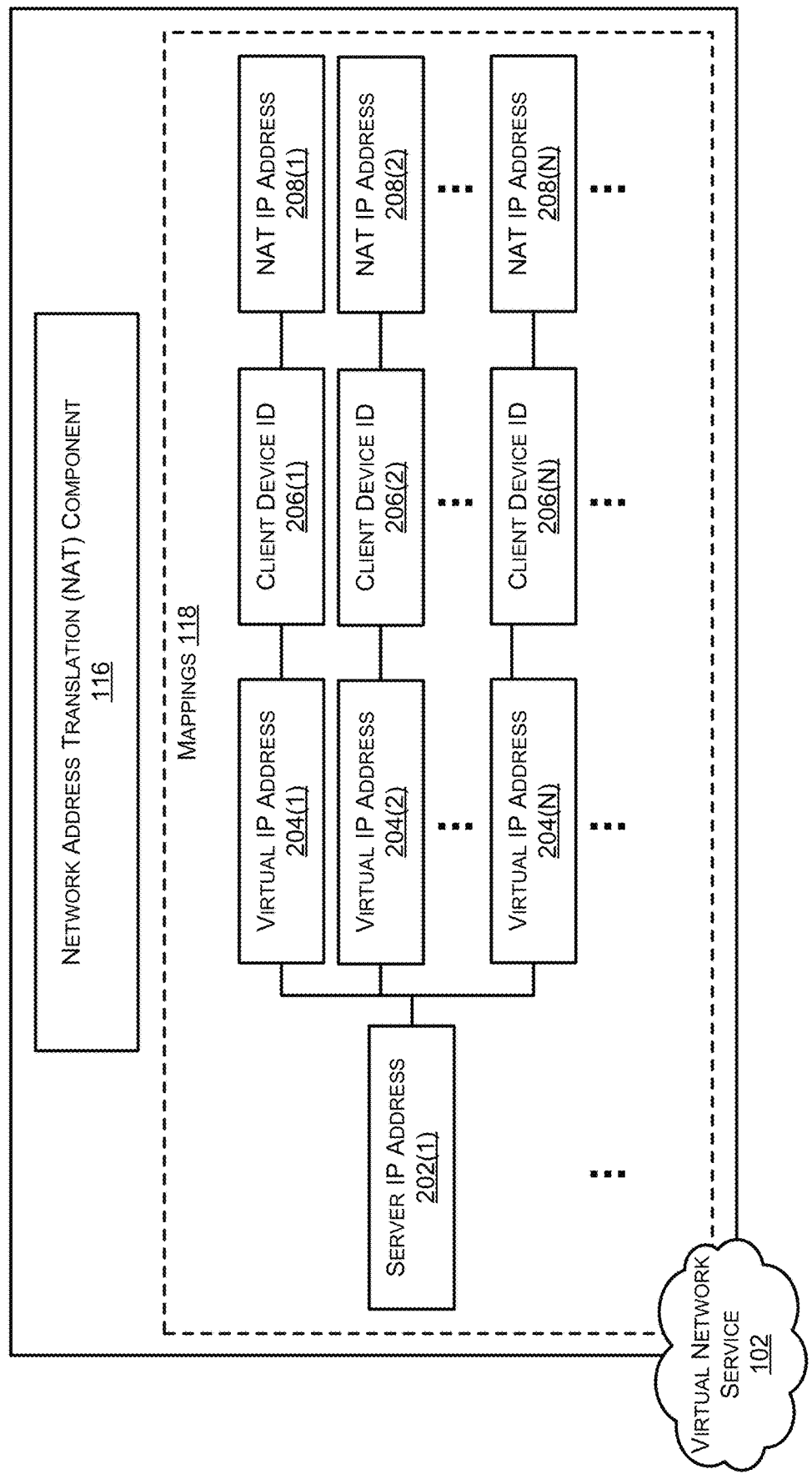
FIG. 2 illustrates example mappings between an IP address of a server, VIP addresses mapped to the IP address, client device identifiers (IDs) mapped to respective VIP addresses, and NAT IP addresses used for respective client devices.

FIG. 2 illustrates example mappings 118 between an IP address of a server, VIP addresses mapped to the IP address, client device identifiers (IDs) mapped to respective VIP addresses, and NAT IP addresses used for respective client devices. As illustrated, the NAT component 116 may store mappings, which may generally be any type of association in memory. Although not illustrated, at least some of the mapping 118 information may be stored at the DNS 106, and/or the DNS 106 may be included in the virtual network service 102.

The NAT component 116 may initially store indications of service IP addresses 202(1)-202(N) (not illustrated). Generally, each endpoint device 110, or server, has at least one actual server IP address 202. Each server IP address 202 may then be mapped to, or allocated, a virtual network of VIP addresses 204(1)-204(N) where "N" is based on the number of client devices 104 that have requested the IP address for the particular server 110.

Each time the NAT component 116 allocates and provides a client device 104 with a VIP address 204, the NAT component 116 may store an association or mapping 118 between the VIP address 204 and a client device ID 206 for that client device 104 (E.g., client IP address in some examples). Thus, each VIP address 204 is associated with a respective client device ID 206. In some instances, the NAT component 116 may further map each client device ID 206 with a respective NAT IP address 208 that is used for ensuring that return traffic from the servers 110 is sent back to the virtual network service 102. By having a NAT IP address 208 mapped to each client device ID 206, when the virtual network service 102 receives traffic back from the endpoint devices 110 that has the destination address as a particular NAT IP address 208, the NAT component 116 may use the mappings 116 to translate the NAT IP address 208 back to a client IP address of the client device 104 and send the packet to the correct client device 104 using the current client IP address.

It should be understood that the mappings 118 are merely illustrative, and other types of mappings 118 or data structures can be used for the NAT techniques described herein.

Figure 3A:
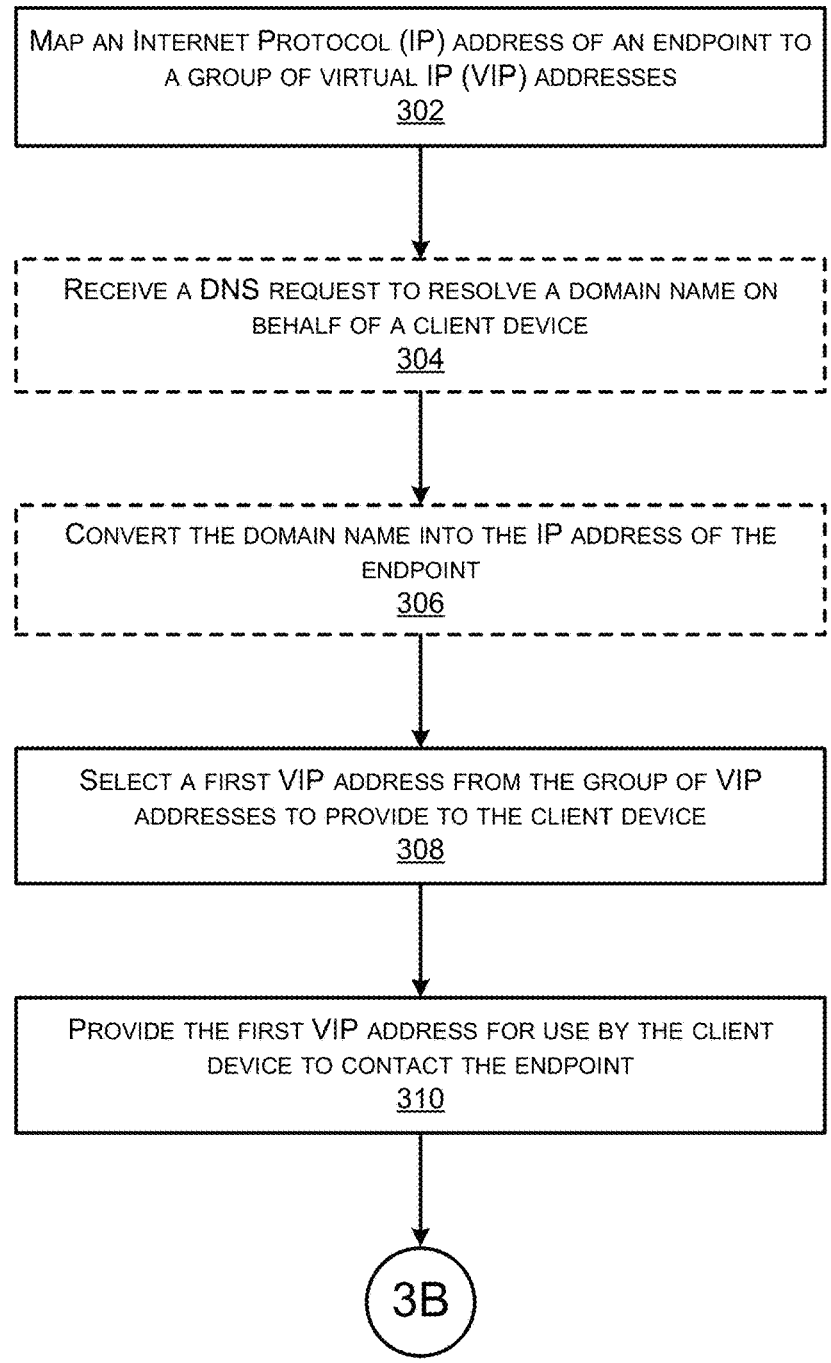
FIGS. 3A and 3B collectively illustrate a flow diagram of an example method for using Network Address Translation (NAT) in conjunction with DNS to anonymize server-side addresses in data communications.
Figure 3B:
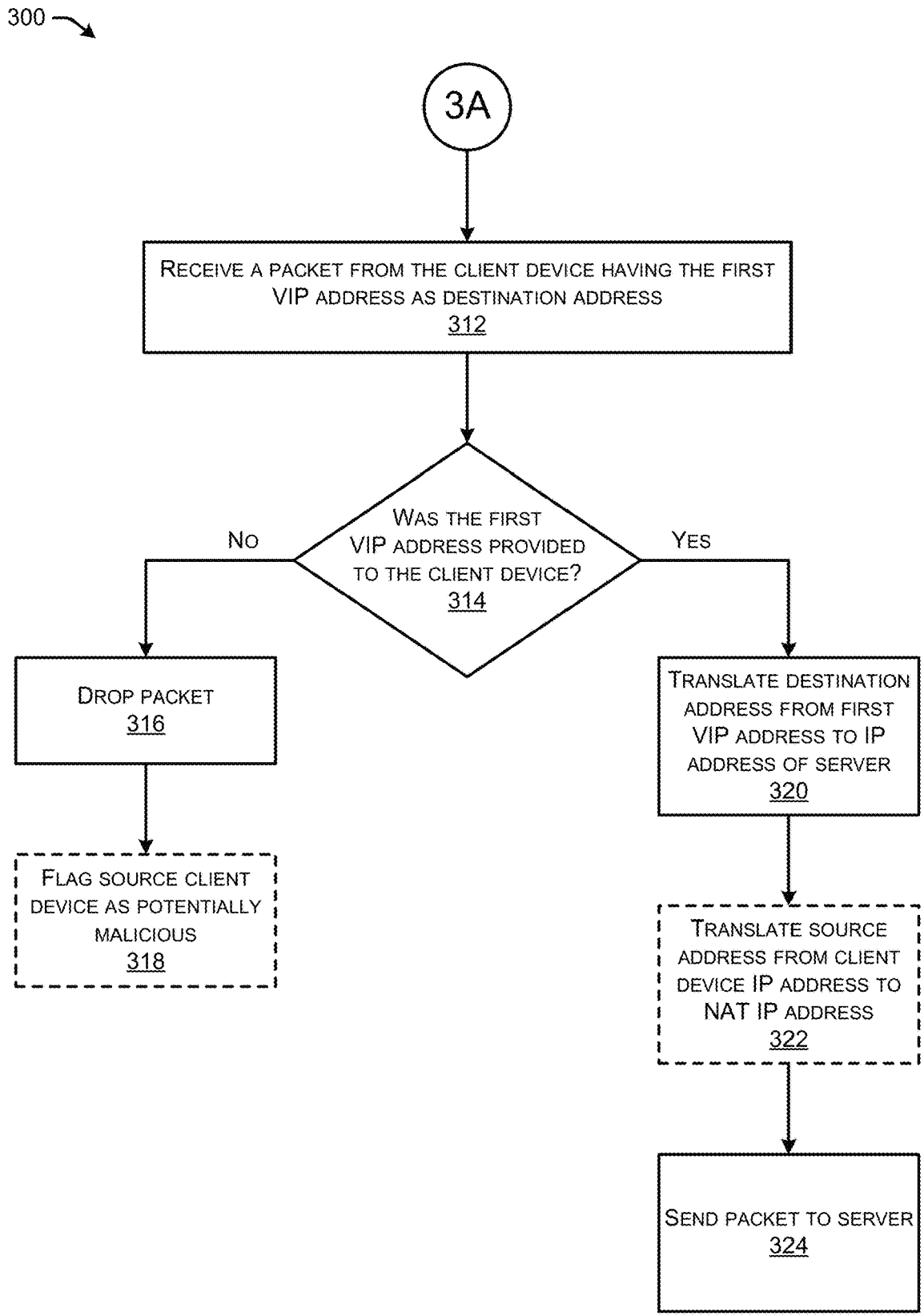

FIGS. 3A and 3B collectively illustrate a flow diagram of an example method 300 that illustrates aspects of the functions performed at least partly by the devices as described in FIGS. 1A, 1B, 1C, and 2. The logical operations described herein with respect to FIGS. 3A and 3B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3A and 3B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, and/or different components.

FIGS. 3A and 3B collectively illustrate a flow diagram of an example method 300 for using Network Address Translation (NAT) in conjunction with DNS to anonymize server-side addresses in data communications.

In some examples, the steps of method 300 may be performed, at least partly, by a virtual network service 102, which may include, be included in, or at least be associated with a DNS 106 (e.g., communicatively coupled). The virtual network service 102 may comprise one or more processors and one or more non-transitory computer-readable media storing computer-executable instructions that, when executed by the one or more processors, cause the one or more processors to perform the operations of method 300.

At 302, the virtual network service 102 may map an IP address of an endpoint to a group of VIP addresses. For instance, the NAT component 118 may allocate a virtual network, which may be the group of VIP addresses, for an IP address of a server 110.

At 304, the virtual network service 102 may receiving a DNS request to resolve a domain name on behalf of a client device. For instance, the DNS 106 may receive a DNS request 112 that includes a domain name 114 for a website, service, etc., that the client device 104 is requesting be resolved.

At 306, the virtual network service 102 may convert the domain name into the IP address of the endpoint. For instance, the DNS 106 may perform standard techniques for translating or converting the domain name 114 into a corresponding IP address.

It should be noted that steps 304 and 306 may be performed by the virtual network service 102 that includes a DNS 106, or may be performed independent of the virtual network service 102 and by an independent DNS 106.

At 308, the virtual network service 102 may select a first VIP address from the group of VIP addresses to provide to the client device. For instance, the virtual network service 102 may allocate a unique VIP address 122 for the client device 104, where the VIP address 122 maps to the client device 104 ID in the mappings 118.

At 310, the virtual network service 102 may provide the first VIP address for use by the client device to contact the endpoint. For instance, the virtual network service 102 may provide the VIP address 122 to the DNS 106, which in turn provides the VIP address 122 to the client device 104 in a DNS response 124.

At 312, the virtual network service 102 may receive a packet from the client device that has the first VIP address as the destination address. For instance, the virtual network service 102 may receive a client packet 126 from the client device 104 that includes the VIP address 122 that maps to the IP address 120 of the endpoint/server 110 that the client device 104 would like to communicate with.

At 314, the virtual network service 102 may determine whether the first VIP address was provided to the client device 314. For instance, the NAT component 116 may check the mappings 118 to see if the VIP address 122 was provided to the client device 104 and is mapped to the client device ID.

In instances where the first VIP address was not provided to the client device (e.g., rogue device), the virtual network service 102 may, at 316 drop the packet because the device is not permitted to use that VIP address. Further, the virtual network service 102 may also flag the source device as potentially malicious at 318 because the source device was using a VIP address that was not provided to it by the virtual network service 102, and it may have been improperly obtained by a malicious observer.

In instances where the first VIP address was provided to the client device 104, the virtual network service 102 may translate the destination address from the first VIP address to an IP address of the server at 310. Further, the virtual network service 102 may, optionally, translate the source address from being the client device IP address 128 to the NAT IP address 130 for return traffic from the server/endpoint 110. At 324, the virtual network service 102 may then send the client packet 126 to the endpoint device 110.

In some examples, rather than using a VIP address 122, which may be selected from a pool of VIP addresses 122, the techniques described herein may include using random IP addresses as the destination address for data packets sent from client devices 104. The random IP address may be a true, routable IP address. In some examples, such as for IPv6 packets, the "random" portion of the IP address may be in the interface ID of the IPv6 address (e.g., the upper 64 bits) and used for routing, and the first or most significant 64 bits (e.g., lower 64 bits) may include a prefix IP address that corresponds to a gateway or router that sits in front of the destination, endpoint devices 110. In such examples, the state mapping of the random IP address to the actual IP address is maintained in the router or gateway such that IP packet, when received at the gateway/router, are then translated using NAT to the appropriate endpoint device 110 or backend service. The duration of randomness for the packets may depend on the implementation. For instance, the randomness could be per packet in some instances, and in some instances the randomness duration could be per session.

Generally, the randomized portion of the destination IP address may be determined using any type of randomization algorithm or process. The randomized portion of the destination IP address may be determined or generated without using the actual IP address such that the randomized IP address cannot be used to determine the actual IP address of the destination endpoint or service.

In some instances, the techniques are performed using IPv6 addresses. For IPv6 addresses, there are 128 bits total that are available, and the number of bits used to route a packet through networks and to a gateway/router may be somewhere between 48 and 64 bits. In some instances, the extra bits can convey other information, such as a sequence ID for an application ID, encryption information, randomization information to randomize the destination address, and so forth. The techniques are equally applicable to IPv4 packets as well. For instance, you can encapsulate an IPv6 packet into an IPv4 packet such that networks or devices that use or support IPv4 can perform the techniques described herein.

Figure 4A:
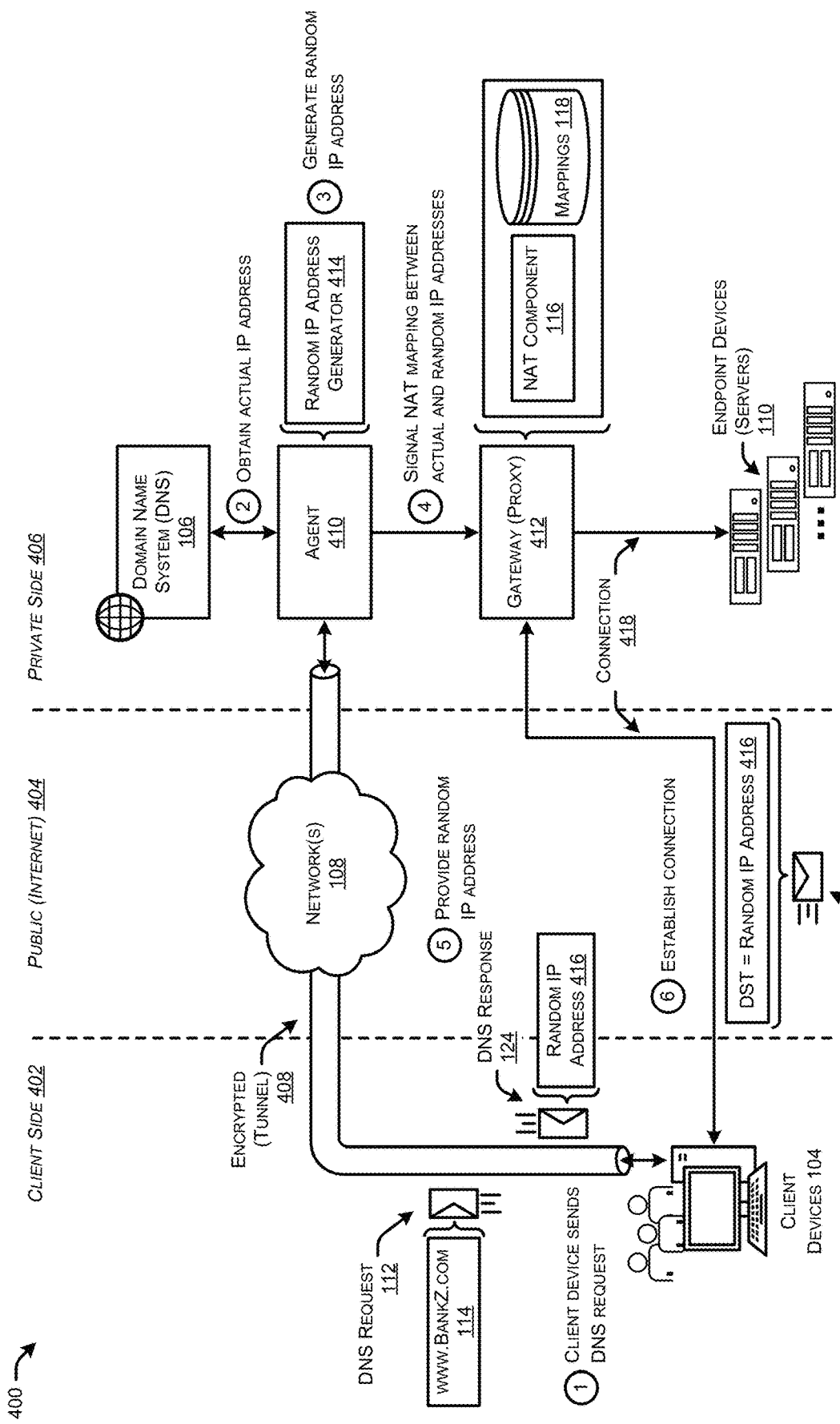
FIG. 4A illustrates a system-architecture diagram in which an agent works with a DNS server to allow a client device to communicate with an endpoint device using a random IP address that cannot be used to identify a backend service.

FIG. 4A illustrates a system-architecture diagram 400 in which an agent works with a DNS server to allow a client device to communicate with an endpoint device using a random IP address that cannot be used to identify a backend service.

As illustrated, client devices 104 are able to communicate with DNS 106, which is generally one or more DNS servers that perform DNS operations. The client devices 104 may be any type of computing device that uses DNS to communicate with one or more endpoint devices 110. For instance, the client devices 104 may be personal user devices (e.g., desktop computers, laptop computers, phones, tablets, wearable devices, entertainment devices such as televisions, etc.), network devices (e.g., servers, routers, switches, access points, etc.), and/or any other type of computing devices.

As shown, the client devices 104 may be in a client side 402 of the architecture, and the architecture may further include a public portion 404 (e.g., the Internet and/or other public networks) and a private side 406 that comprises one or more networks and one or more devices that are private and access is restricted by a managing entity.

The client devices 104 may send, at "1", a DNS request 112 having a domain name 114 over the networks 108 and to an agent 410 on the private side 406. The DNS request 112 may include a request for the DNS 106 to translate a domain name (e.g., "www.BankZ.com") into an IP address that can be used for sending traffic to the desired website, service, etc., associated with the domain name.

The agent 410 may be running or have access to a random IP address generator 414 that generates and assigns random IP addresses. The random IP address generator 414 may use any randomization technique or generator to determine random numbers that can be used for IP addresses.

At "2," the agent 410 may obtain an actual IP address 106 for the desired endpoint device 110 or backend service. The agent 410 may provide the DNS 106 with an indication of the domain name that the client device 104 would like translated into an IP address. In response, the DNS 106 may provide the actual IP address to the agent 410 for the desired domain name.

The agent may then, at "3," generate a random IP address for the DNS request 112 that is to be used to mask or randomize the IP address of the desired endpoint device 110. For instance, the random IP address may be a true, routable IP address. In some examples, such as for IPv6 packets, the "random" portion of the IP address may be in the interface ID of the IPv6 address (e.g., the upper 64 bits) and lower 64 bits may include a prefix IP address that corresponds to a gateway proxy 412 (e.g., network gateway, router, etc.) that sits in front of the destination, endpoint devices 110.

In such examples, the agent 410 may, at "4," signal or provide the mapping of the NAT mapping between the random IP address and the actual IP address to the gateway 412. The gateway 412 may store the mapping in a mappings database 118 for later use and lookup when the gateway 412 receives packets having randomized IP addresses.

At "5," the agent 410 may provide the random IP address 416 to the client device 104. The random IP address 416 may be provided to the client device 104 in a DNS response 124 such that the client device 104 determines that the random IP address 416 is usable to contact the desired endpoint device 110. Although illustrated as servers, the endpoint devices 110 can generally be any device that a client device 104 would like to contact, including user devices (e.g., laptops, phones, wearable devices, etc.), network devices (e.g., routers, switches, hubs, etc.), and/or any other type of devices that can be contacted over networks 108.

At "6," the client device 104 may establish a connection with the endpoint device 110. For instance, the client device 104 may send a client packet 126 over the network(s) 108 using the random IP address 416 as the destination address of the packet 126. The random IP address 416 may include a portion that is associated with reaching the gateway 412 such that the device(s) in the network(s) 108 may route the client packet 126 to the gateway 412.

The gateway 412 may receive the client packet 126 and use the NAT component 116 and mappings 118 to determine where the client packet 126 is to be sent. For instance, the NAT component 116 may utilize mappings 118 to determine how to translate or convert the destination address 416. Specifically, the NAT component 116 may identify, from the mappings 118, that the random IP address 416 is mapped to an IP address for actual service on an endpoint device 110, and translate the random IP address 416 to the actual service IP address 120 of the server/endpoint device 110 and place the server IP address 120 in the destination address of the client packet 126. In this way, the client device 104 may communicate via the gateway 412 with the endpoint device(s) 110 to establish a communication connection 418.

Figure 4B:
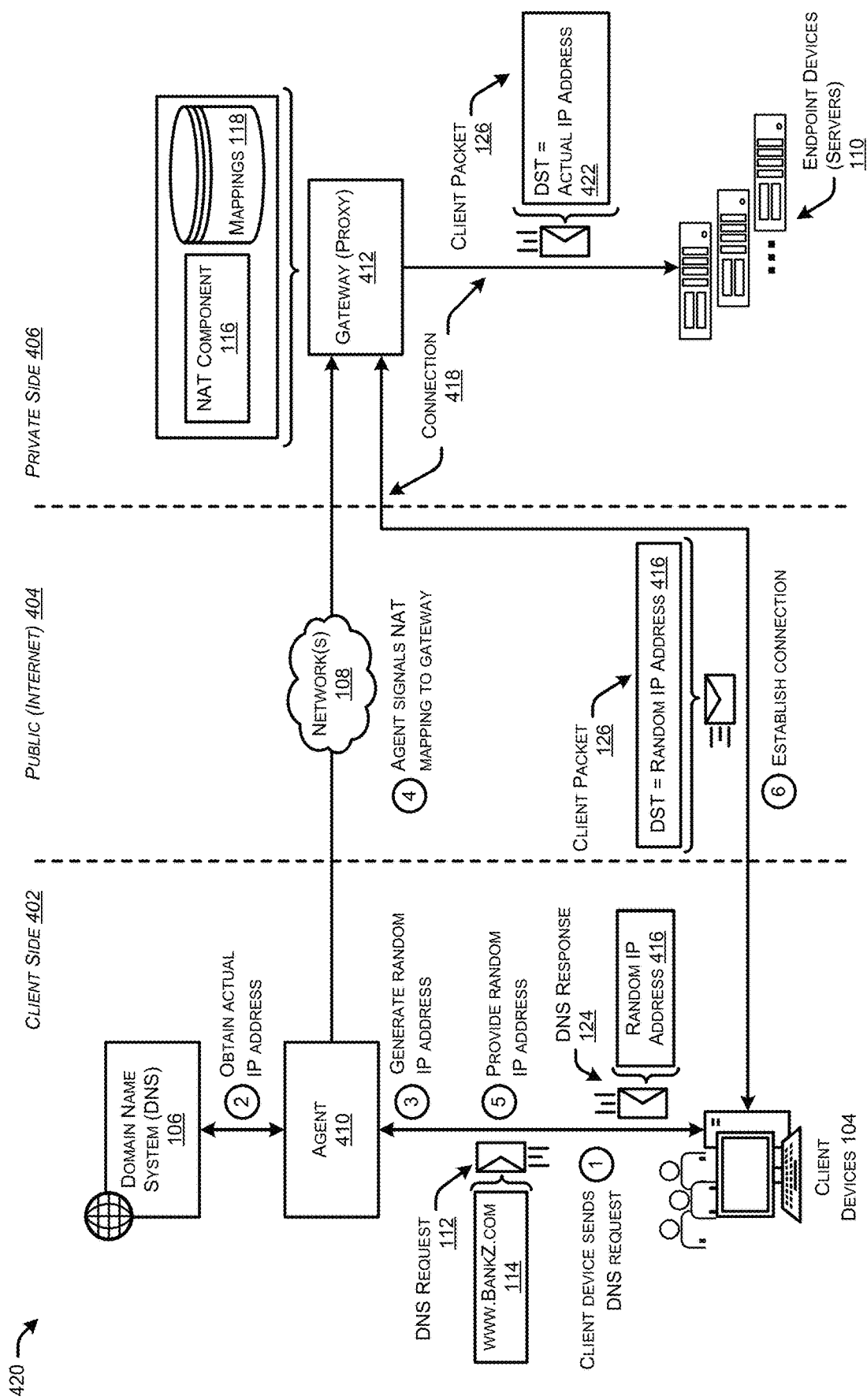
FIG. 4B illustrates a system-architecture diagram in which an agent running on or near a client device works with a DNS server to allow the client device to communicate with an endpoint device using a random IP address that cannot be used to identify a backend service.

FIG. 4B illustrates a system-architecture diagram 420 in which an agent 410 running on or near a client device 104 works with a DNS server 106 to allow the client device 104 to communicate with an endpoint device 110 using a random IP address 416 that cannot be used to identify a backend service 110.

The client devices 104 may send, at "1", a DNS request 112 having a domain name 114 to an agent 410 on the client side 402. In this case, the agent 410 may be running on the client device 104 itself, and/or on a device "near" the client device 104 (e.g., local area network (LAN) router, neighboring device, edge device, etc.). In this example, the agent 410 may be running on a device on the client side 402 such that the DNS request 112 may not pass through a public network 404.

The DNS request 112 may include a request for the DNS 106 to translate a domain name (e.g., "www.BankZ.com") into an IP address that can be used for sending traffic to the desired website, service, etc., associated with the domain name. The agent 410 may be running or have access to a random IP address generator 414 that generates and assigns random IP addresses. The random IP address generator 414 may use any randomization technique or generator to determine random numbers that can be used for IP addresses.

At "2," the agent 410 may obtain an actual IP address 106 for the desired endpoint device 110 or backend service. The agent 410 may provide the DNS 106 with an indication of the domain name that the client device 104 would like translated into an IP address. In this example, the DNS 106 may similarly be on the client side 402, but may be in the public 404 or private side 406 in some instances. In response, the DNS 106 may provide the actual IP address to the agent 410 for the desired domain name.

The agent 410 may then, at "3," generate a random IP address for the DNS request 112 that is to be used to mask or randomize the IP address of the desired endpoint device 110. For instance, the random IP address may be a true, routable IP address. In some examples, such as for IPv6 packets, the "random" portion of the IP address may be in the interface ID of the IPv6 address (e.g., the upper 64 bits) and lower 64 bits may include a prefix IP address that corresponds to a gateway proxy 412 (e.g., network gateway, router, etc.) that sits in front of the destination, endpoint devices 110.

In such examples, the agent 410 may, at "4," signal or provide the mapping of the NAT mapping between the random IP address 416 and the actual IP address to the gateway 412. In the illustrative example, the signaling of the NAT mapping may be sent over the network(s) 108 to the gateway 412 which is running on the private side 406. The gateway 412 may store the mapping in a mappings database 118 for later use and lookup when the gateway 412 receives packets having randomized IP addresses.

At "5," the agent 410 may provide the random IP address 416 to the client device 104. The random IP address 416 may be provided to the client device 104 in a DNS response 124 such that the client device 104 determines that the random IP address 416 is usable to contact the desired endpoint device 110. At "6," the client device 104 may establish a connection with the endpoint device 110. For instance, the client device 104 may send a client packet 126 over the network(s) 108 using the random IP address 416 as the destination address of the packet 126. The random IP address 416 may include a portion that is associated with reaching the gateway 412 such that the device(s) in the network(s) 108 may route the client packet 126 to the gateway 412.

The gateway 412 may receive the client packet 126 and use the NAT component 116 and mappings 118 to determine where the client packet 126 is to be sent. For instance, the NAT component 116 may utilize mappings 118 to determine how to translate or convert the destination address 416. Specifically, the NAT component 116 may identify, from the mappings 118, that the random IP address 416 is mapped to an IP address for actual service on an endpoint device 110, and translate the random IP address 416 to the actual service IP address 120 of the server/endpoint device 110 and place the server IP address 120 in the destination address of the client packet 126. In this way, the client device 104 may communicate via the gateway 412 with the endpoint device(s) 110 to establish a communication connection 418.

Figure 4C:
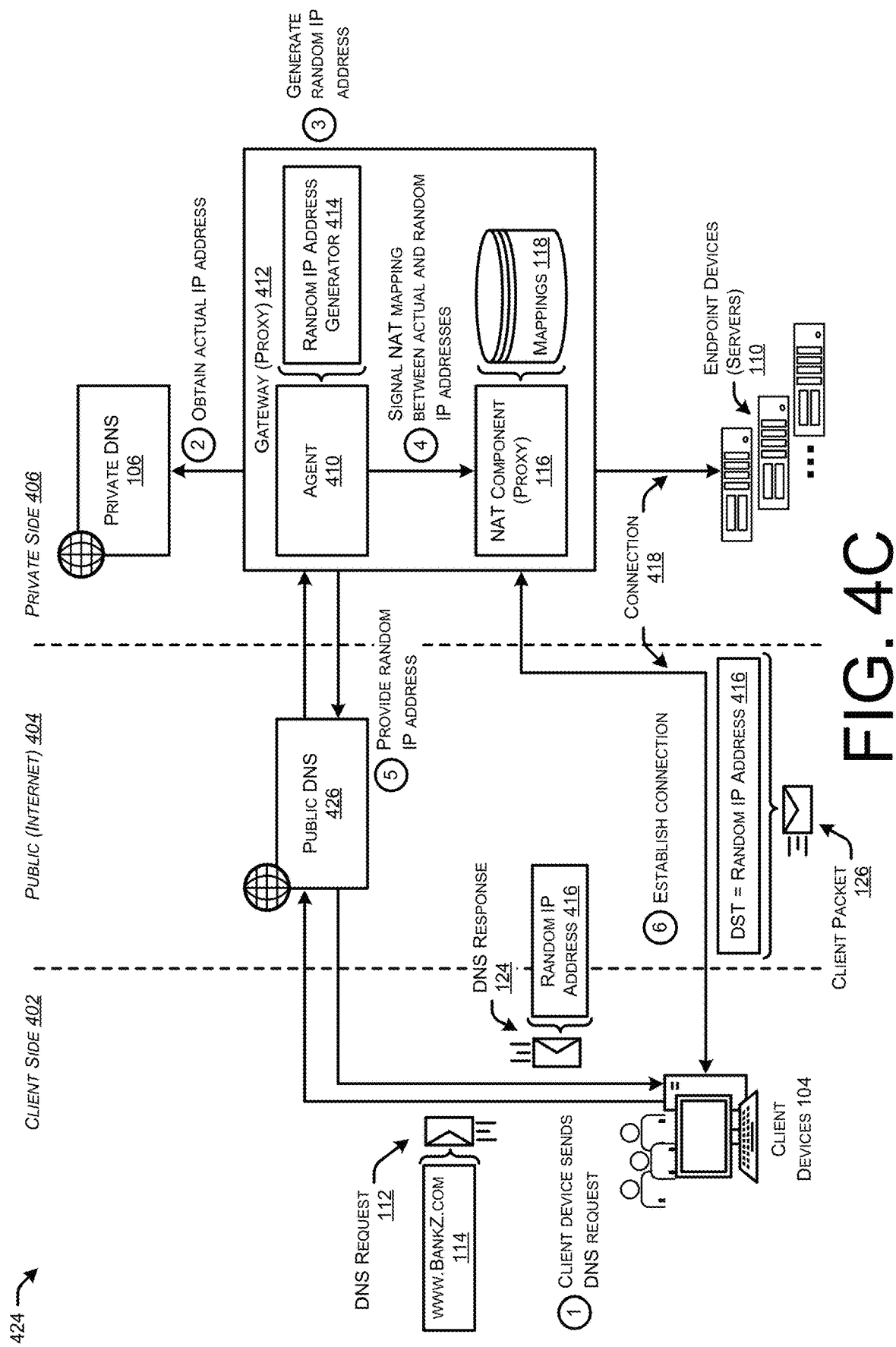
FIG. 4C illustrates a system-architecture diagram in which an agent works with a public DNS server to allow a client device to communicate with an endpoint device using a random IP address that cannot be used to identify a backend service.

FIG. 4C illustrates a system-architecture diagram 424 in which an agent 410 works with a public DNS 426 server to allow a client device 104 to communicate with an endpoint device 110 using a random IP address 416 that cannot be used to identify a backend service.

As illustrated, client devices 104 are able to communicate with a public DNS 426 via an encrypted tunnel 408, where the public DNS 426 is generally one or more DNS servers that perform DNS operations. The public DNS 426 may be a global DNS resolution service that is offered to users of the public network 404, such as the Internet. The public DNS 106 may function as a recursive name server.

The client devices 104 may send, at "1", a DNS request 112 having a domain name 114 to the public DNS 426. The DNS request 112 may include a request for the DNS 106 to translate a domain name (e.g., "www.BankZ.com") into an IP address that can be used for sending traffic to the desired website, service, etc., associated with the domain name. in this example, the DNs request 112 may be sent via an unencrypted communication channel to the public DNS 426.

The public DNS 426 may be configured to communication with the gateway proxy 412, on which is running the agent 410. As shown, the agent 410 may be running on the gateway 412 in some instances. The agent 410 may then, at "2," communicate with a private DNS 106 (e.g., provide domain name) to obtain the actual IP address for the destination service with which the client device 104 desires to communicate. The private DNS 106 may translate or resolve the domain name into the actual IP address and provide the address to the agent 410.

The agent 410 may be running or have access to a random IP address generator 414 that generates and assigns random IP addresses. The random IP address generator 414 may use any randomization technique or generator to determine random numbers that can be used for IP addresses. The agent 410 may then, at "3," generate a random IP address 416 for the DNS request 112 that is to be used to mask or randomize the IP address of the desired endpoint device 110. For instance, the random IP address 416 may be a true, routable IP address. In some examples, such as for IPv6 packets, the "random" portion of the IP address may be in the interface ID of the IPv6 address (e.g., the upper 64 bits) and lower 64 bits may include a prefix IP address that corresponds to a gateway proxy 412 (e.g., network gateway, router, etc.) that sits in front of the destination, endpoint devices 110.

In such examples, the agent 410 may, at "4," signal or provide the mapping of the NAT mapping between the random IP address and the actual IP address to the NAT component 116. The NAT component 116 may store the mapping in a mappings database 118 for later use and lookup when the gateway 412 receives packets having randomized IP addresses. Packings having random IP addresses 416 may be routed through network(s) 404 and ultimately to the gateway 412 such that the gateway 412 is able to handle the random IP addresses 416. That is, in some instances, the random IP addresses 416 generated by the agent 410 may terminate or be destined for the gateway 412, or at least hit the gateway 412 along the network path to the destination.

At "5," the agent 410 may provide the random IP address 416 to the public DNS 426, which then sends the random IP address 416 to the client device 104. The random IP address 416 may be provided to the client device 104 in a DNS response 124 such that the client device 104 determines that the random IP address 416 is usable to contact the desired endpoint device 110. Although illustrated as servers, the endpoint devices 110 can generally be any device that a client device 104 would like to contact, including user devices (e.g., laptops, phones, wearable devices, etc.), network devices (e.g., routers, switches, hubs, etc.), and/or any other type of devices that can be contacted over networks 108.

At "6," the client device 104 may establish a connection with the endpoint device 110. For instance, the client device 104 may send a client packet 126 over the network(s) 108 using the random IP address 416 as the destination address of the packet 126. The random IP address 416 may include a portion that is associated with reaching the gateway 412 such that the device(s) in the network(s) 108 may route the client packet 126 to the gateway 412.

The gateway 412 may receive the client packet 126 and use the NAT component 116 and mappings 118 to determine where the client packet 126 is to be sent. For instance, the NAT component 116 may utilize mappings 118 to determine how to translate or convert the destination address 416. Specifically, the NAT component 116 may identify, from the mappings 118, that the random IP address 416 is mapped to an IP address for actual service on an endpoint device 110, and translate the random IP address 416 to the actual service IP address 120 of the server/endpoint device 110 and place the server IP address 120 in the destination address of the client packet 126. In this way, the client device 104 may communicate via the gateway 412 with the endpoint device(s) 110 to establish a communication connection 418.

Figure 5:
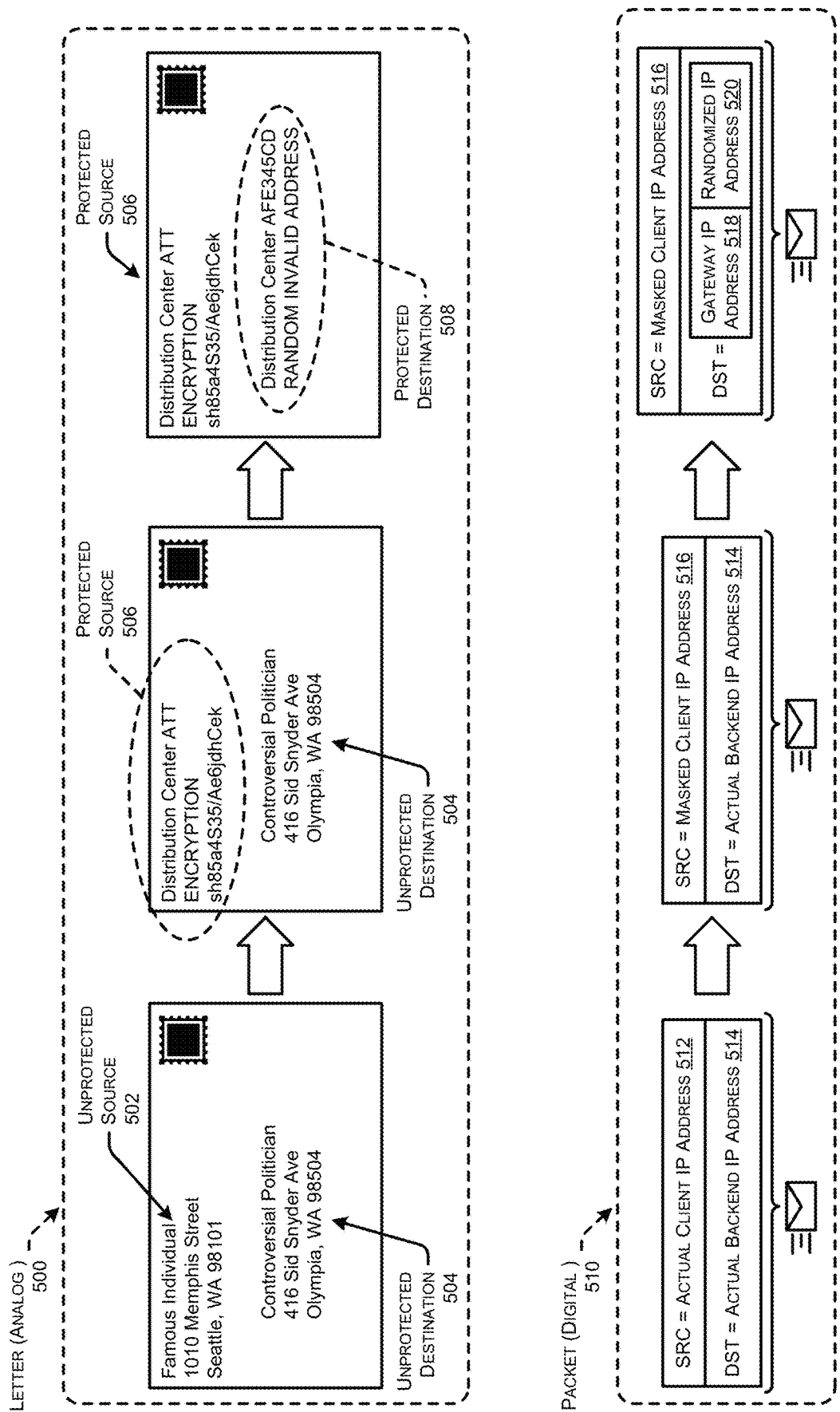
FIG. 5 illustrates analog and digital examples of randomizing the destination of a letter or a data packet.

FIG. 5 illustrates analog and digital examples of randomizing the destination of a letter or a data packet.

As shown, a letter (analog) 500 example is illustrated where the letter 500 initially has an unprotected source 502 as well as an unprotected destination 504. In such an example, any entity that sees the letter (e.g., post office workers) would be able to determine that a "famous individual" is communicating with a "controversial politician." However, the famous individual may desire that his or her identity be kept private, and also desire that the destination of their letters be kept private as well.

Accordingly, the famous individual may place a protected source 506 in the letter 500 such that people who see the letter 500 are unable to determine who sent the letter 500. However, the famous individual may further desire that the unprotected destination 504 be obfuscated as well to prevent users from attempting to determine who is sending the letter 500 to the controversial politician.

As shown, the letter may further have a protected destination 508. The protected destination 508 may be a distribution center through which the controversial politician can be reached, but an observer may be unable to determine from whom, and to whom, the letter 500 is being sent.

FIG. 5 further illustrates a packet (digital) 510 example where similar techniques are performed on a packet 510. As shown, the packet 510 may originally have the actual client IP address 512 listed as the source address, and the actual backend IP address 514 listed as the destination address. However, the sender and/or receiver of the packet 510 may prefer that the source and/or destination addresses be obfuscated such that observers (e.g., public Internet observers) are unable to determine the source and/or destination of the packet 510. As shown, the packet 510 may then have a masked client IP address 516 (e.g., NATted IP address), and may further have a masked destination IP address. In the illustrated example, the destination address may be populated by an IP address comprising at least a gateway IP address 518 of a gateway associated with a desired destination of the client device 104, and a randomized IP address 520 that is used to mask or randomize the destination IP address. In the example of an IPv6 address, the randomized IP address 520 portion of the destination IP address may be in the interface ID of the IPv6 address (e.g., the upper 64 bits) and lower 64 bits may include the gateway IP address 518, such as a prefix IP address that corresponds to a gateway proxy 412 (e.g., network gateway, router, etc.) that sits in front of the destination, endpoint devices 110.

Figure 6:
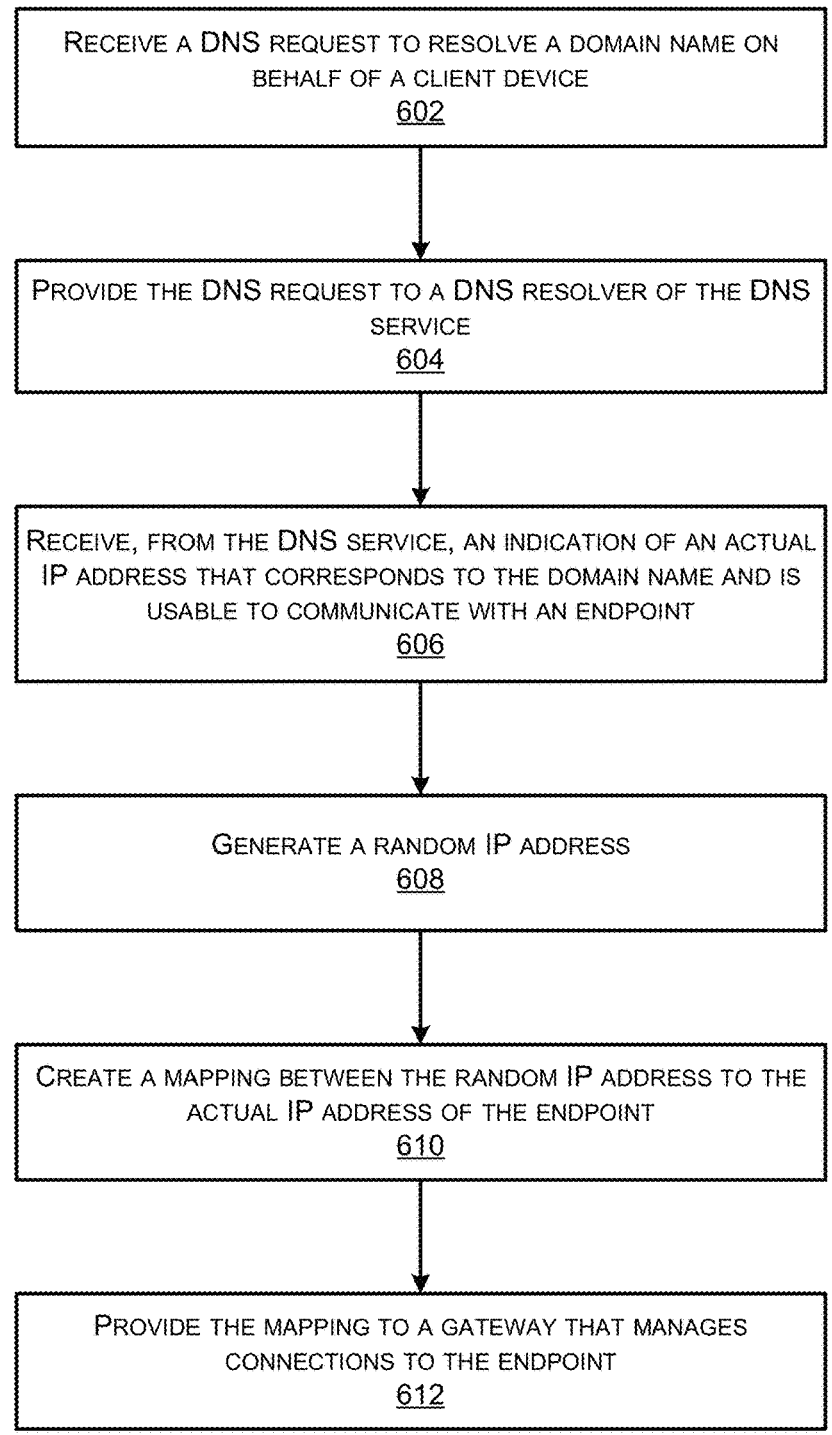
FIG. 6 illustrates a flow diagram of an example method for an agent to work in conjunction with DNS and a gateway to use NAT and randomize server-side addresses in data communications.
Figure 7:
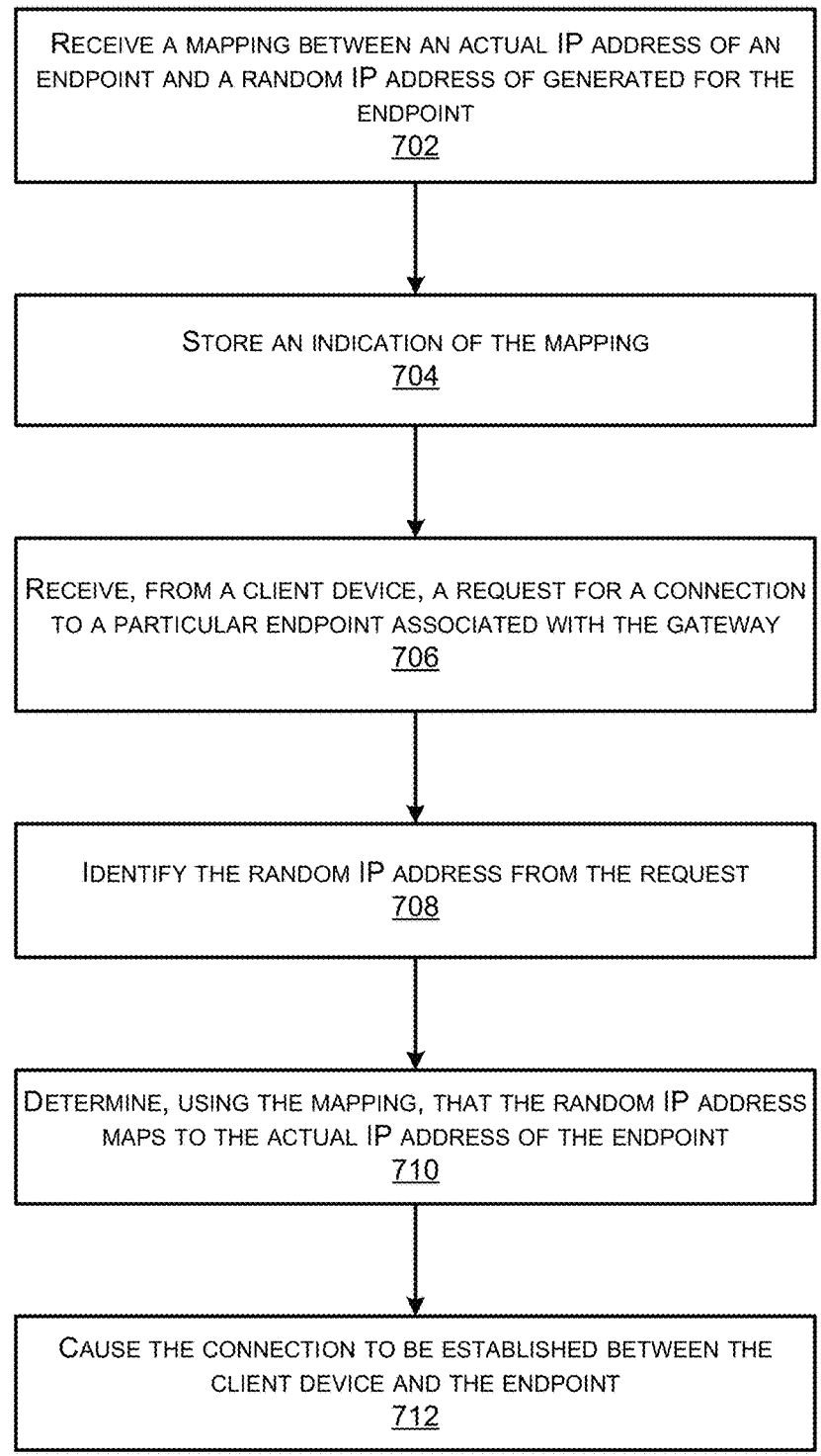
FIG. 7 illustrates a flow diagram of an example method for a gateway to use NAT to enable randomization of server-side addresses in data communications.

FIGS. 6 and 7 illustrate flow diagrams of example methods 600 and 700 that illustrate aspects of the functions performed at least partly by the devices as described in FIGS. 1A-5. The logical operations described herein with respect to FIGS. 6 and 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6 and 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, and/or different components.

FIG. 6 illustrates a flow diagram of an example method 600 for an agent 410 to work in conjunction with DNS 106 and a gateway 412 to use NAT and randomize server-side addresses in data communications. The agent 410 may run on any type of device in a network, such as a server, the gateway 412 itself, and/or any network device.

At 602, the agent 410 may receive a DNS request to resolve a domain name on behalf of a client device. For instance, the DNS 106 may receive a DNS request 112 that includes a domain name 114 for a website, service, etc., that the client device 104 is requesting be resolved. At 604, the agent may provide the DNS request to a DNS resolve of the DNS service. For instance, the agent 410 may send the DNS request 112 to the DNS server 106.

At 606, the agent may receive, from the DNS service, an indication of an actual IP address that corresponds to the domain name and is usable to communicate with an endpoint. That is, DNS server 106 may translate the domain name into the actual IP address for the endpoint associated with the domain name.

At 608, the agent may generate a random IP address by populating a first set of bits of the random IP address with a gateway IP address of the gateway, and populating a second set of bits of the random IP address with randomly generated IP address bits.

At 610, the agent may create a mapping between the random IP address to the actual IP address of the endpoint. Finally, at 612, the agent may provide the mapping to a gateway 412 that manages connections to the endpoint.

In some instances, the method 600 may further comprise providing the random IP address to at least one of the client device or the DNS service to enable the DNS service to provide the random IP address to the client device. That is, the agent 410 may not necessarily provide the random IP address back to the client device, but use another device.

The method 600 may further include receiving, at the gateway, a packet having a destination address that is the random IP address, performing, at the gateway, Network Address Translation (NAT) by changing the destination address of the packet from the random IP address to the actual IP address of the endpoint, and sending the packet to a next hop associated with the actual IP address of the endpoint.

In some instances, the method 600 may further include receiving a return packet from the endpoint, determining that a destination address of the return packet is a client IP address of the client device, performing NAT by changing a source address of the return packet from the actual IP address to the random IP address, and sending the return packet to the client device.

FIG. 7 illustrates a flow diagram of an example method 700 for a gateway 412 to use NAT to enable randomization of server-side addresses in data communications.

At 702, the gateway 412 may receive a mapping between an actual IP address of an endpoint and a random IP address of generated for the endpoint. The mapping may be received from an agent 410 and/or DNS 106.

At 704, the gateway 412 may store an indication of the mapping. For instance, the gateway 412 may store the mapping in a mappings database 118 associated with a NAT component 116.

At 706, the gateway 412 may receive, from a client device 410, a request for a connection to a particular endpoint associated with the gateway 412. For instance, the gateway 412 may receive a packet 126 that is destined for the endpoint 110 based on the random IP address 416 indicated in the packet 126.

At 708, the gateway 412 may identify the random IP address from the request. For instance, the client packet 126 may have a destination address field populated with the random IP address 416.

At 710, the gateway 412 may determine, using the mapping, that the random IP address maps to the actual IP address of the endpoint. In some instances, the NAT component 116 may NAT or translate the random IP address in the client packet 126 into the actual IP address of the endpoint device 110. At 712, the gateway 412 may cause the connection to be established between the client device and the endpoint. For instance, the gateway 412 may act as a proxy between the endpoint device 110 and client device 104 and facilitate the connection 418.

In some instances, the method 700 may further include receiving a packet having a destination address that is the random IP address, performing Network Address Translation (NAT) by changing the destination address of the packet from the random IP address to the actual IP address of the endpoint, and sending the packet to a next hop associated with the actual IP address of the endpoint.

The method 700 may further include receiving a return packet from the endpoint, determining that a destination address of the return packet is a client IP address of the client device, performing NAT by changing a source address of the return packet from the actual IP address to the random IP address, and sending the return packet to the client device.

Figure 8:
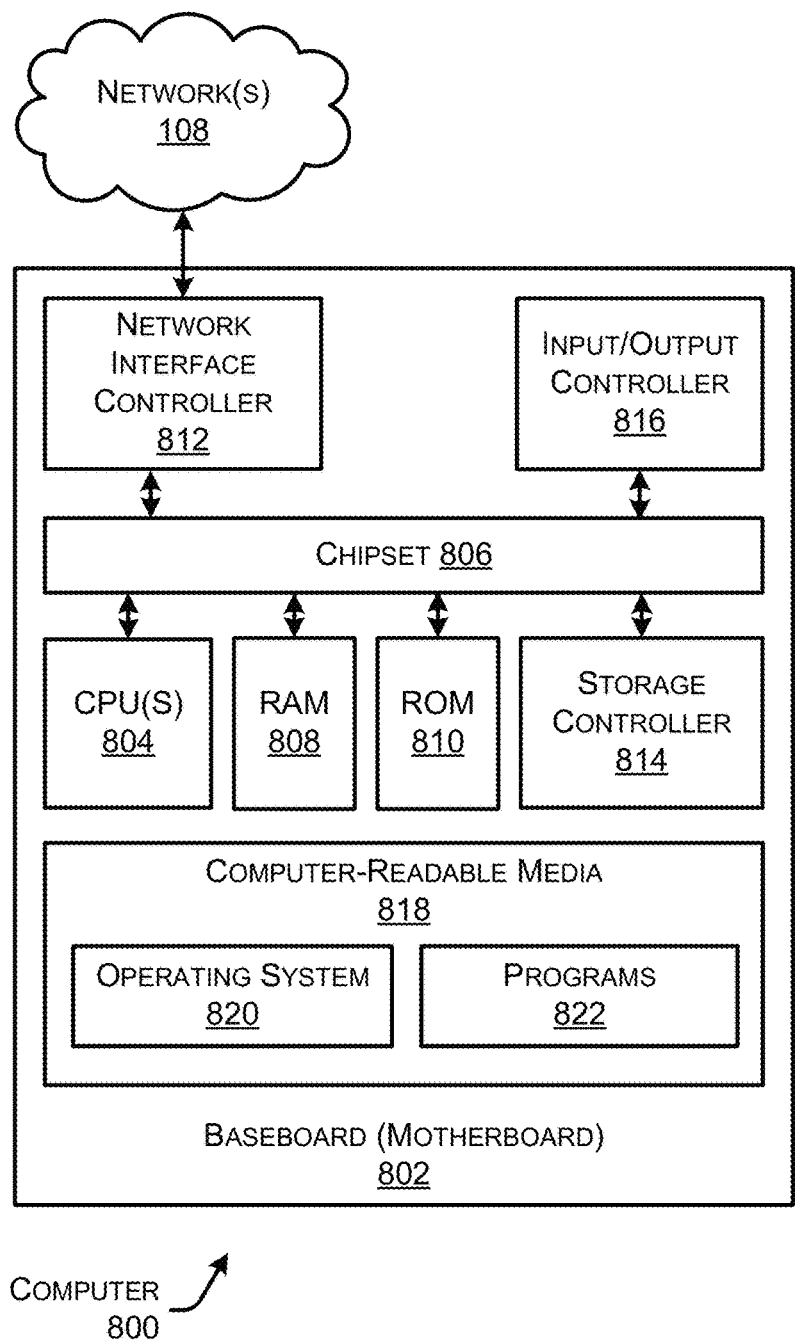
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The computer 800 may, in some examples, correspond to a device and/or a system of devices that support the virtual network service 102, the DNS 106, the agent 410, the gateway proxy 412, and/or a combination thereof, described herein, and may comprise networked devices such as servers, switches, routers, hubs, bridges, gateways, modems, repeaters, access points, etc. That is, the computer 800, or a system of computers 800, may be configured to perform some or all of the techniques performed by the virtual network service 102, some or all of the techniques performed by the DNS 106, some or all of the techniques performed by the agent 410, some or all of the techniques performed by the gateway proxy 412, and/or any combination thereof.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 108. The chipset 806 can include functionality for providing network connectivity through a NIC 812, such as a gigabit Ethernet adapter. The NIC 812 is capable of connecting the computer 800 to other computing devices over the network 108. It should be appreciated that multiple NICs 812 can be present in the computer 800, connecting the computer to other types of networks and remote computer systems.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by devices in the virtual service network 102, and or any components included therein, may be supported by one or more devices similar to computer 800. Stated otherwise, some or all of the operations performed by the virtual service network 102, and or any components included therein, may be performed by one or more computer devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The computer 800 may include one or more hardware processors 804 (processors) configured to execute one or more stored instructions. The processor(s) 804 may comprise one or more cores. Further, the computer 800 may include one or more network interfaces configured to provide communications between the computer 800 and other devices, such as the communications described herein as being performed by the virtual service network 102. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for providing a virtual service network 102 that is capable of anonymizing service-side addresses. That is, the computer 800 may comprise any one of the devices that support the virtual service network 102. The programs 822 may comprise any type of program that cause the computer 800 to perform techniques for communicating with other devices using any type of protocol or standard, and performing NAT and/or DNS, to anonymize server-side addresses.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method to anonymize Internet Protocol (IP) addresses of endpoints using anonymized IP addresses, the method comprising:
   receiving, from a Domain Name Service (DNS) resolver of a DNS service, an indication of an actual IP address that corresponds to a domain name and is usable by a client device to communicate with an endpoint;
   generating an anonymized IP address by:
      populating a first portion of the anonymized IP address with a network IP address of an intermediate device, the intermediate device being disposed between the client device and the endpoint; and
      populating a second portion of the anonymized IP address with anonymized IP address bits;
   creating a mapping between the anonymized IP address and the actual IP address of the endpoint; and
   providing the mapping to the intermediate device.

2. The method of claim 1, further comprising providing the anonymized IP address to at least one of the client device or the DNS service to enable the DNS service to provide the anonymized IP address to the client device.

3. The method of claim 1, wherein the anonymized IP address is a routable IP address that is routed between the client device and the endpoint.

4. The method of claim 1, further comprising:
   receiving, at the intermediate device, a packet having a destination address that is the anonymized IP address;
   performing, at the intermediate device, Network Address Translation (NAT) by changing the destination address of the packet from the anonymized IP address to the actual IP address of the endpoint; and
   sending the packet to a next hop associated with the actual IP address of the endpoint.

5. The method of claim 4, further comprising:
   receiving a return packet from the endpoint;
   determining that a destination address of the return packet is a client IP address of the client device;
   performing NAT by changing a source address of the return packet from the actual IP address to the anonymized IP address; and
   sending the return packet to the client device.

6. The method of claim 1, wherein:
   an agent generates the anonymized IP address; and
   the agent is running on the intermediate device or another device located in a network in which the endpoint is located.

7. The method of claim 1, wherein:
   an agent generates the anonymized IP address; and
   the agent is running on the client device or another device associated with a same local area network (LAN) as the client device.

8. The method of claim 1, wherein:
   an agent generates the anonymized IP address; and
   the agent is included in the DNS service.

9. A system that anonymizes Internet Protocol (IP) addresses of endpoints using anonymized IP addresses, the system comprising:
   one or more processors; and
   one or more non-transitory computer-readable media storing computer-executable instructions that, when executed by the one or more processors, cause the one or more processors to perform operations comprising:
      receiving, from a Domain Name Service (DNS) resolver of a DNS service, an indication of an actual IP address that corresponds to a domain name and is usable by a client device to communicate with an endpoint;

generating an anonymized IP address by:
- populating a first portion of the anonymized IP address with a network IP address of an intermediate device, the intermediate device being disposed between the client device and the endpoint; and
- populating a second portion of the anonymized IP address with anonymized IP address bits;

creating a mapping between the anonymized IP address and the actual IP address of the endpoint; and providing the mapping to the intermediate device.

10. The system of claim 9, the operations further comprising providing the anonymized IP address to at least one of the client device or the DNS service to enable the DNS service to provide the anonymized IP address to the client device.

11. The system of claim 9, wherein the anonymized IP address is a routable IP address that is routed between the client device and the endpoint.

12. The system of claim 9, further comprising:
receiving a packet having a destination address that is the anonymized IP address;
performing Network Address Translation (NAT) by changing the destination address of the packet from the anonymized IP address to the actual IP address of the endpoint; and
sending the packet to a next hop associated with the actual IP address of the endpoint.

13. The system of claim 9, the operations further comprising:
receiving a return packet from the endpoint;
determining that a destination address of the return packet is a client IP address of the client device;
performing NAT by changing a source address of the return packet from the actual IP address to the anonymized IP address; and
sending the return packet to the client device.

14. The system of claim 9, wherein:
an agent generates the anonymized IP address; and
the agent is running on the intermediate device or another device located in a network in which the endpoint is located.

15. The system of claim 9, wherein:
an agent generates the anonymized IP address; and
the agent is running on the client device or another device associated with a same local area network (LAN) as the client device.

16. A device that anonymizes Internet Protocol (IP) addresses of endpoints using anonymized IP addresses, the device comprising:
one or more processors; and
one or more non-transitory computer-readable media storing computer- executable instructions that, when executed by the one or more processors, cause the one or more processors to perform operations comprising:
receiving, from a Domain Name Service (DNS) resolver of a DNS service, an indication of an actual IP address that corresponds to a domain name and is usable by a client device to communicate with an endpoint;
generating an anonymized IP address by:
- populating a first portion of the anonymized IP address with a network IP address of an intermediate device, the intermediate device being disposed between the client device and the endpoint; and
- populating a second portion of the anonymized IP address with anonymized IP address bits;

creating a mapping between the anonymized IP address and the actual IP address of the endpoint; and providing the mapping to the intermediate device.

17. The device of claim 16, the operations further comprising providing the anonymized IP address to at least one of the client device or the DNS service to enable the DNS service to provide the anonymized IP address to the client device.

18. The device of claim 16, wherein the anonymized IP address is a routable IP address that is routed between the client device and the endpoint.

19. The device of claim 16, further comprising:
receiving a packet having a destination address that is the anonymized IP address;
performing Network Address Translation (NAT) by changing the destination address of the packet from the anonymized IP address to the actual IP address of the endpoint; and
sending the packet to a next hop associated with the actual IP address of the endpoint.

20. The device of claim 16, the operations further comprising:
receiving a return packet from the endpoint;
determining that a destination address of the return packet is a client IP address of the client device;
performing NAT by changing a source address of the return packet from the actual IP address to the anonymized IP address; and
sending the return packet to the client device.

* * * * *